United States Patent
David et al.

(10) Patent No.: US 11,921,695 B2
(45) Date of Patent: Mar. 5, 2024

(54) TECHNIQUES FOR RECORDING METADATA CHANGES

(71) Applicant: Dell Products L.P., Hopkinton, MA (US)

(72) Inventors: Bar David, Rishon Lezion (IL); Dror Zalstein, Givatayim (IL); Vladimir Shveidel, Pardes-Hana (IL)

(73) Assignee: Dell Products L.P., Hopkinton, MA (US)

( * ) Notice: Subject to any disclaimer, the term of this patent is extended or adjusted under 35 U.S.C. 154(b) by 214 days.

(21) Appl. No.: 17/494,225

(22) Filed: Oct. 5, 2021

(65) Prior Publication Data

US 2023/0106982 A1   Apr. 6, 2023

(51) Int. Cl.
*G06F 16/00* (2019.01)
*G06F 16/23* (2019.01)

(52) U.S. Cl.
CPC ............................... *G06F 16/2343* (2019.01)

(58) Field of Classification Search
CPC .................................................. G06F 16/2343
See application file for complete search history.

(56) References Cited

U.S. PATENT DOCUMENTS

| | | | | |
|---|---|---|---|---|
| 9,632,711 B1* | 4/2017 | Obr | ....................... | G06F 3/0619 |
| 11,068,199 B2 | 7/2021 | Shveidel et al. | | |
| 2007/0245104 A1* | 10/2007 | Lindemann | ......... | G06F 11/1469 |
| | | | | 711/162 |
| 2009/0259993 A1* | 10/2009 | Konduri | .............. | G06F 11/3664 |
| | | | | 717/127 |
| 2011/0289049 A1* | 11/2011 | Zeng | ....................... | G06F 16/22 |
| | | | | 707/769 |
| 2013/0097369 A1* | 4/2013 | Talagala | .............. | G06F 12/0804 |
| | | | | 711/103 |
| 2013/0124956 A1* | 5/2013 | Hatfield | ................ | G06F 40/197 |
| | | | | 715/211 |
| 2016/0344834 A1* | 11/2016 | Das | ..................... | H04L 67/1097 |
| 2018/0004428 A1* | 1/2018 | Seong | ................... | G06F 3/0688 |
| 2020/0349110 A1 | 11/2020 | Shveidel et al. | | |
| 2022/0342816 A1* | 10/2022 | Derzhavetz | ........... | G06F 3/0659 |
| 2022/0342825 A1* | 10/2022 | Derzhavetz | ......... | G06F 9/30047 |

\* cited by examiner

*Primary Examiner* — Syed H Hasan
(74) *Attorney, Agent, or Firm* — Muirhead and Saturnelli, LLC

(57) ABSTRACT

In a dual node system, each node can store metadata updates in a volatile memory metadata log. Metadata pages can be used to access data stored on a volume. A node designated as preferred or affined for a volume can be expected to receive I/Os directed to the volume. A preferred node for a volume can record, in its volatile memory metadata log, the metadata changes for the metadata pages used to access data stored on the volume. A non-preferred or non-affined node for the volume can infrequently receive I/Os directed to the volume. A non-preferred node for a volume can record, in its volatile memory metadata log, pointers or references to the metadata changes for the metadata pages used to access data stored on the volume, where the pointers or references map to persisted copies of the meta changes as stored in a persisted metadata log.

17 Claims, 12 Drawing Sheets

200 ─┐

202 — Initiator node needs to update a set of one or more MD pages for a transaction for a write I/O received by the initiator node. Each of the one or more MD pages can have a first corresponding local lock on the initiator node and a second corresponding local lock on the peer node. The initiator node acquires a first set of the one or more local locks for the set of one or more MD pages of the transaction on the initiator node.

204 — The initiator node sends a commit message to its peer node. The commit message is a request from the initiator node to the peer node to acquire a second set of the one or more local locks of the peer node for the set of MD pages of the transaction. The commit message also requests to apply the MD updates to the one or more MD pages. The commit message includes the MD updates for the one or more MD pages.

206 — The peer node receives the commit message. In response, processing can be performed to acquire, for the initiator node for the transaction, the second set of one or more local locks of the peer node for the set of one or more MD pages of the transaction.

208 — The peer node can persistently store, in the persisted metadata log, the MD updates to the one or more MD pages of the transaction.

210 — The peer node can store one or more entries or tuples in its in-memory metadata log for the one or more MD page updates received from the initiator node. Each such tuple or entry for a MD page update is an RLD ref tuple or entry which references, or points to, a corresponding entry in the persisted metadata log. The corresponding entry of the persisted metadata log includes the actual metadata update or changed content to be applied to the MD page. The peer node can store and apply the MD updates to its node-local cached copy (e.g., node local volatile memory cached copy), if any, of each of the one or more MD pages of the transaction.

212 — The second set of one or more local locks of the peer node associated with the one or more MD pages of the transaction can be released.

214 — Sending, from the peer node to the initiator node, a reply.

TECHNIQUES FOR RECORDING METADATA CHANGES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, at a first node, a metadata update request to apply a first metadata change to a first metadata page; acquiring, by the first node, a first lock on the first node for the first metadata page; sending a commit message from the first node to a second node, wherein the commit message is a request by the first node to acquire a second lock for the first metadata page on the second node and apply the first metadata change to the first metadata page, and wherein the commit message includes the first metadata change for the first metadata page; acquiring, by the first node, the second lock for the first metadata page; persistently storing, by the second node, the first metadata change to the first metadata page in a first persisted entry of a persisted metadata log; recording, in an in-memory metadata log of the second node, a first entry for the first metadata change to the first metadata page, wherein the first entry includes a reference or pointer to the first persisted entry of the persisted metadata log; releasing the second lock for the first metadata page; sending, from the second node to the first node, a reply to the commit message; responsive to receiving the reply, performing first processing by the first node including: recording, in an in-memory metadata log of the first node, a second entry for the first metadata change to the first metadata page, wherein the second entry includes the first metadata change to the first metadata page; and releasing the first lock for the first metadata page.

In at least one embodiment, the first node and the second node can be in a same data storage system, wherein a first set of one or more paths can be between one or more initiator ports of a host and a first set of one or more target ports of the first node. A second set of one or more paths can be between one or more initiator ports of the host and a second set of one or more target ports of the second node. The first node can be a preferred node for servicing I/O operations for a first logical device exposed to the host over the first set of one or more paths between the host and the first node, and the second node can be a non-preferred node for servicing I/O operations for the first logical device exposed to the host over the second set of one or more paths between the host and the second node. Each path of the first set of one or more paths can be configured as an optimized or preferred path for the first logical device. Each path of the second set of one or more paths can be configured as a non-optimized or non-preferred path for the first logical device. The method can include issuing, by the host, I/Os to the first logical device over one or more of the optimized paths of the first set of one or more paths between the host and the first node. In at least one embodiment the host can only issue I/Os to the first logical device over a non-optimized or non-preferred path of the second set of one or more paths when there is no available optimized or preferred path of the first set of one or more paths between the host and the first node.

In at least one embodiment, processing can include determining, by the host, that there is no available optimized or preferred path of the first set of one or more paths between the host and the first node; and responsive to said determining, sending, by the host, a first I/O operation to the first logical device over a first of the non-optimized or non-preferred paths of the second set of one or more paths between the host and the second node. The first non-optimized or non-preferred path can be between a first initiator of the host and a first target port of the second node. The first I/O operation can be a write I/O operation that writes first data to a target logical address on the first logical device. Processing can include: receiving, by the second node, the write I/O operation at the first target port; determining, in accordance with one or more criteria, that the second node is a preferred node for the first logical device; performing second processing to service the write I/O operation, said second processing including: determining a second metadata change to a second metadata page, wherein the second metadata page is used in connection with accessing the target logical address of the first logical device; persistently storing, by the second node, the second metadata change to the second metadata page in a second persisted entry of the persisted metadata log; and recording, in the in-memory metadata log of the second node, a third entry for the second metadata change to the second metadata page, wherein the third entry includes the second metadata change to the second metadata page. The one or more criteria can specify that the second node is designated as a preferred node for the first logical device responsive to the second node receiving at least a specified amount of I/O workload for the first logical device. The one or more criteria can specify that the second node is designated as a preferred node for the first logical device responsive to configuration information of the host or the same data storage system indicating that the second node is designated as a preferred node for the first logical device.

In at least one embodiment, processing can include receiving, at the first node, a read I/O operation to read first data from a target logical address on a first logical device; determining, by the first node, that the first metadata page is needed to access the first data stored at the target logical address on the first logical device; determining, by the first node, that the first metadata page is not included in a volatile memory cache of the first node; and responsive to determining by the first node that the first metadata page is not included in the volatile memory cache of the first node, constructing, by the first node, a latest version of the first metadata page. Constructing the latest version of the first metadata page can include: retrieving, by the first node, a stored version of the first metadata page from non-volatile backend storage; and applying, by the first node, a set of one or more metadata changes to the stored version of the first metadata page to generate the latest version of the first metadata page wherein the set of one or more metadata changes includes the first metadata change as recorded in the second entry of the in-memory metadata log of the first node. Responsive to constructing, by the first node, the latest version of the first metadata page, processing can be performed that includes storing, by the first node, the latest version of the first metadata page in the volatile memory cache of the first node.

In at least one embodiment, processing can include: receiving, at the second node, a read I/O operation to read first data from a target logical address on a first logical device; determining, by the second node, that the first metadata page is needed to access the first data stored at the target logical address on the first logical device; determining, by the second node, that the first metadata page is not included in a volatile memory cache of the second node; and responsive to determining, by the second node, that the first metadata page is not included in the volatile memory cache of the second node, constructing, by the second node, a latest version of the first metadata page. Constructing the latest version of the first metadata page by the second node can include: retrieving, by the second node, a stored version of the first metadata page from non-volatile backend storage; and applying, by the second node, a set of one or more metadata changes to the stored version of the first metadata page to generate the latest version of the first metadata page, wherein the set of one or more metadata changes includes the first metadata change recorded by the first entry of the in-memory metadata log of the second node. Applying the set of one or more metadata changes by the second node can include: using the reference or pointer of the first entry of the in-memory metadata log of the second node to access the first persisted entry of the persisted metadata log; and obtaining, by the second node, the first metadata change from the first persisted entry of the persisted metadata log.

In at least one embodiment, processing can include destaging metadata updates from the in-memory metadata log of the second node. Destaging can include: using the reference or pointer of the first entry of the in-memory metadata log of the second node to access the first persisted entry of the persisted metadata log; obtaining, by the second node, the first metadata change from the first persisted entry of the persisted metadata log; and storing, on non-volatile storage, a corresponding entry for the first entry of the in-memory metadata log, wherein the corresponding entry includes the first metadata change rather than the reference or pointer to the first persisted entry of the persisted metadata log.

BRIEF DESCRIPTION OF THE DRAWINGS:

Features and advantages of the present disclosure will become more apparent from the following detailed description of exemplary embodiments thereof taken in conjunction with the accompanying drawings in which:

FIGS. 8, 9A, 9B and 10 are flowcharts of processing steps performed in an embodiment in accordance with the techniques of the present disclosure.

DETAILED DESCRIPTION OF EMBODIMENT(S)

Figure 1:
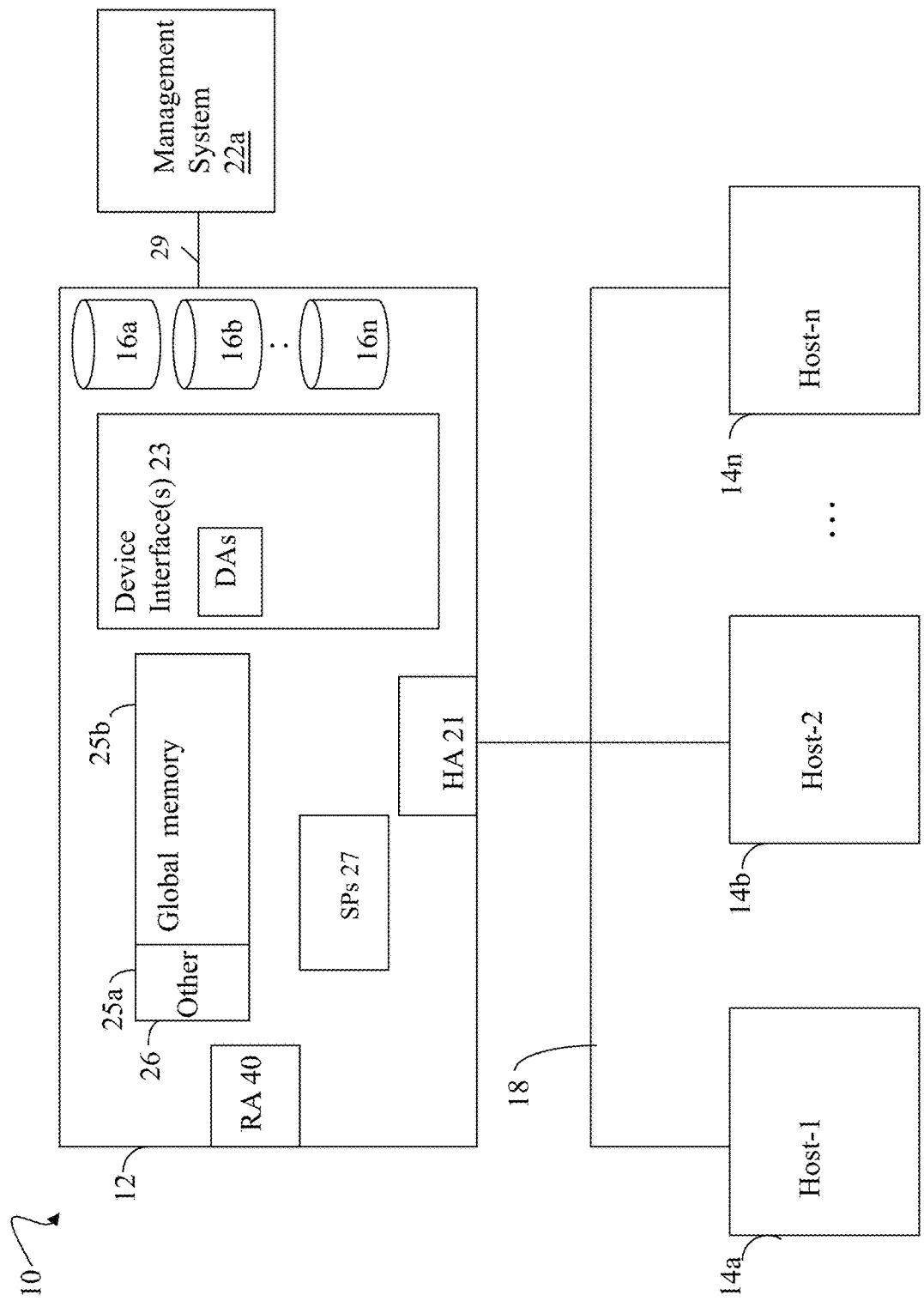
FIG. 1 is an example of components that may be included in a system in accordance with the techniques of the present disclosure.

In at least one existing implementation, a SAN (storage area network) can include one or more data storage systems and one or more hosts or other data storage system clients which operate in accordance with the SCSI (small computer system interface) standard. In particular, the SAN and its components can operate in accordance with the SCSI Asymmetrical Logical Unit Access (ALUA) standard. The ALUA standard specifies a mechanism for asymmetric or symmetric access of a volume or LUN as used herein. The ALUA standard allows the data storage system and/or host to set a LUN's access state with respect to a particular initiator port of the host and a particular target port of the data storage system over which the volume or LUN is exposed. In accordance with the ALUA standard, an access state for each LUN can be specified on a per path basis, where the path is between the initiator port and a target port and where the access state can indicate whether the particular path is optimized (also sometimes referred to herein as preferred) or non-optimized (also sometimes referred to herein as non-preferred). In a dual node data storage system or appliance, both nodes can service I/Os to configured LUNs or volumes and provide a high availability implementation. Based on the ALUA access state for a particular path and a particular LUN in at least one embodiment, a host sends I/Os to the particular LUN over its optimized or preferred paths and otherwise uses a non-optimized path if there are no available optimized or preferred paths.

In a dual node data storage system, although both nodes can service I/Os to the same LUN or volume, it can be advantageous in some ALUA-based implementations to define optimized paths and non-optimized paths for a particular LUN so that all optimized paths for the LUN are to only a single node of the dual node system and that all non-optimized paths for the LUN are to the other remaining node of the dual node system. Thus in such an ALUA-based configuration, it can be expected that generally or primarily only a single one of the nodes associated with all the optimized paths for a LUN services I/Os for the LUN. In at least one existing system in an ALUA-based configuration, both nodes can keep mirrored in-memory copies of modifications made to metadata (MD) pages. The MD pages generally can be used to access user data stored at a particular logical address, and where the logical address can be expressed as a LUN and LBA or logical offset on the LUN. In particular in some embodiments, one or more MD pages can be used exclusively when servicing I/Os for a particular LUN to access data for the particular LUN.

In this case with ALUA-based configurations where the optimized paths for each LUN are configured for only a single node of the data storage system, such a schema where both nodes store complete mirrored in-memory copies of the MD page modifications can be an inefficient use of the volatile memory of the nodes. In particular, the single node with the optimized paths to the LUN can be expected to be the primary or preferred node servicing I/Os for the LUN and can be expected to typically require access to the MD page modifications for the one or more MD pages used exclusively for the LUN. More generally, the single node with the optimized paths to the LUN can be expected to be the primary or preferred node servicing I/Os for the LUN and can be expected to typically require access to the MD page modifications for all MD pages used when mapping logical addresses for the LUN to corresponding physical storage locations (e.g., such as when servicing reads and/or writes that respectively read and/or write data to a logical address of the LUN). In contrast, the other peer node having only the non-optimized paths for the LUN may infrequently, if ever, receive and service I/Os to the LUN, whereby the peer node is not be expected to typically require access to the associated MD page modifications for the one or more MD pages used exclusively for the LUN. For example, in at least one embodiment with a MD mapping structure described in more detail, for example, in connection with FIGS. 3, 4, 5 and 6, MD leaf pages and MD MID pages can be typically only used in connection with a single LUN. In this case for a non-preferred node for a particular LUN, the MD leaf pages and MD MID pages used for the particular LUN can be expected to be infrequently accessed, if at all, by the non-preferred node. In contrast, the MD top page of the MD mapping structure can likely be shared by multiple LUNs depending on the particular capacity or size of such LUNs.

Described in the following paragraphs are techniques which provide for a more efficient use of the volatile memories of the nodes of the data storage system or appliance. In particular, in such ALUA-based configurations as noted above, all optimized paths for a particular LUN can be to a single one of the nodes, where the single one of the nodes can be expected to be the primary or preferred node servicing I/Os for the LUN. In at least one embodiment with an ALUA-based configuration, the techniques assume that a node receiving I/Os for a particular LUN is currently the primary or preferred node for the LUN, where the LUN's primary or preferred node is expected to primarily receive and service I/Os for the particular LUN. In a dual node system in at least one embodiment, the primary or preferred node with respect to the particular LUN can generally be expected to receive all or most of the I/Os directed to the particular LUN, and the remaining non-primary or non-preferred peer node can generally be expected to receive none or very few of the I/Os directed to the particular LUN.

In at least one embodiment, the primary or preferred node for a particular LUN can store in its volatile memory the changes or deltas with respect to MD pages used to access user data stored on the particular LUN. In at least one embodiment, the MD pages can include one or more MD pages used exclusively when accessing user data stored on only the particular LUN, whereby the one or more MD pages may not be used when accessing user data stored on any other LUN. In this case, the one or more MD pages can be characterized as owned exclusively by the particular LUN. In such an embodiment the non-primary or non-preferred peer node for the particular LUN may not store in its volatile memory the changes or deltas with respect to the one or more MD pages used to access user data stored on only the particular LUN. Rather the non-primary or non-preferred peer node can use a different technique to record in its volatile memory entries denoting the changes or deltas for the one or more MD pages owned by the particular LUN. The different technique used by the non-primary or non-preferred peer node can consume less volatile memory in comparison to the amount of volatile memory consumed for recording the MD page changes or deltas on the primary or preferred node's volatile memory. In at least one embodiment the primary or preferred node can use a first technique that records in its volatile memory the actual MD page change or delta. In contrast, the non-primary or non-preferred peer node can use a second different technique that records in its volatile memory a reference or pointer to a persisted copy of the actual MD page change or delta (e.g., the updated content). The second technique used by the non-preferred peer node can consume less volatile memory than the first technique of the primary or preferred node to record a MD page change or delta in a node's volatile memory. In the infrequent or unexpected case, the non-preferred peer node can receive and service I/Os for the particular LUN using at least a first of the one or more MD pages used exclusively for, and owned by, the particular LUN. In this case when servicing the I/O for the particular LUN, the non-preferred peer node can retrieve any actual MD page changes or deltas needed for the first MD page using the references or pointers to the persisted copy of the MD page changes or deltas for the first MD page. The non-preferred peer node may need such MD page changes or deltas for the first MD page, for example, when constructing a current version of the first MD page for destaging, in order to service a unexpectedly received I/O for the particular LUN for which the remaining node is the preferred or primary node, and possibly other scenarios. Thus, in at least one embodiment, the second technique used by the non-preferred peer node with respect to a particular LUN can consume less node-local volatile memory to store the MD page changes or deltas than the first technique. However, in at least one embodiment, the second technique can result in an increased latency (in comparison to using the first technique) should the non-preferred peer node need to access the actual MD page change or delta using the reference or pointer to the persisted copy of the MD page change or delta.

In at least one embodiment, the preferred or primary node for the particular LUN can use the above-noted first technique in connection with recording, in the volatile memory of the preferred node, changes or deltas to the one or more MD pages used in connection with exclusively accessing data for only a single LUN, the particular LUN, which exclusively owns the one or more MD pages. In at least one embodiment, the preferred or primary node for the particular LUN can more generally use the above-noted first technique in connection with recording, in the volatile memory of the preferred node, changes or deltas to any MD pages used in connection with accessing data for the particular LUN. In at least one embodiment, the non-preferred peer node for the particular LUN can use the above-noted second technique in connection with recording, in the volatile memory of the non-preferred peer node, entries denoting the changes or deltas to the one or more MD pages used in connection with exclusively accessing data for only a single LUN, the particular LUN, which exclusively owns the one or more MD pages. For example, the non-preferred node for the particular LUN can use the above-noted second technique when recording in the node's volatile memory MD changes to the MID and leaf MD pages owned by the particular LUN.

In at least one embodiment, at least some MD pages can be used in connection with accessing data of multiple LUNs where such MD pages are not exclusively used to access data for only a single LUN, and where such MD pages can be characterized as shared by multiple volumes or LUNs. In at least one embodiment, the first technique can be used by both nodes in connection with the MD pages that are shared by multiple volumes or LUNs and thus used in accessing user data stored on such multiple volumes or LUNs. For example, top MD pages of the MD mapping structure described in more detail, for example, in connection with FIGS. 3, 4, 5 and 6, can be typically shared among multiple LUNs and used in connection with mapping logical to physical addresses to access data stored on the multiple LUNs. In at least one embodiment, metadata changes to the top MD pages can be recorded using the first technique by both preferred and non-preferred nodes for the multiple LUNs.

In at least one embodiment, the techniques described in the present disclosure can be used in non-ALUA-based configurations. In such non-ALUA-based configurations in at least one embodiment, it may be that there is no ALUA designation of preferred or non-preferred for each path over which a LUN is exposed to a host, and thus, no designation of preferred or non-preferred for each node for the LUN based on ALUA-based path state designations. Rather, an alternate technique can be used to designate a node as preferred or non-preferred. In such an embodiment, the host can send I/Os directed to the LUN over paths to both nodes of the dual node appliance and/or use some other host-based algorithm to select a particular path for sending I/Os to the LUN exposed over target ports of the data storage system. The techniques of the present disclosure can also be used in such non-ALUA-based configurations but may experience greater I/O latency in contrast to use of the techniques of the present disclosure in ALUA-based configurations. For example, a designation of preferred or non-preferred can be applied to each node with respect to a particular LUN on a per write I/O basis. A first node receiving a write I/O directed to the particular LUN can be designated as the preferred node for that particular write I/O, and the remaining second peer node can be designated as the non-preferred node for that particular write I/O. In this case, the first node designated as a preferred node for that particular write I/O to the particular LUN can record a MD page modification needed for servicing the write I/O as a MD page delta or change in an entry of the preferred node's in-memory MD log where the entry uses the first technique and includes the metadata change or content as part of the entry of in-memory metadata log of the preferred node. For the non-preferred node for the particular write I/O to the particular LUN, the MD page modification can be recorded using the second technique with an entry in the non-preferred node's in-memory MD log where the entry includes a reference or pointer to the persisted copy of the MD page delta or change as stored in the persisted MD log in the non-volatile memory.

In at least one embodiment in a dual node data storage system or appliance, a designation of preferred or non-preferred can be applied to each node with respect to a particular LUN. A node designated as a preferred node with respect to a particular LUN can mean that, for write I/Os directed to the particular LUN where servicing the write I/Os includes making one or more MD page modifications, each such MD page modification can be recorded as a MD page delta or change in an entry of the preferred node's in-memory MD log. The entry in the preferred node's in-memory MD log can include the actual MD update. In contrast, a node can be designated as a non-preferred node with respect to a particular LUN. For the non-preferred node for the particular LUN, each such MD page modification can be recorded using an entry in the non-preferred node's in-memory MD log where the entry includes a reference or pointer to the persisted copy of the MD page delta or change as stored in the persisted MD log in the non-volatile memory.

In at least one embodiment, a node can be designated as preferred or non-preferred and accordingly record any MD changes made when servicing received write I/Os based on the node's current designation of preferred or non-preferred. Generally, designation of a node as preferred or non-preferred for a particular LUN can be determined in accordance with one or more criteria. In at least one embodiment, the node can be designated as preferred or non-preferred with respect to a LUN on a per write I/O basis, where the node which receives the I/O can be designated as the preferred node when servicing the particular write I/O and where the remaining peer node can be designated as the non-preferred node when servicing the particular write I/O.

As a variation in at least one embodiment, each node can be assigned a designation of preferred or non-preferred with respect to a particular LUN based on current configuration settings specified by the appliance or system including the node. The current configuration settings can indicate for each particular LUN which one or more nodes are preferred, if any and which one or more nodes are non-preferred, if any. The current settings can be specified automatically on the appliance or data storage system, and/or can be user-specified such as using a data storage system management application. When servicing write I/Os directed to the LUN where servicing the write I/Os includes making one or more MD page modifications, each such MD page modification can be recorded as a MD page delta or change in an entry of the preferred node's in-memory MD log. The entry in the preferred node's in-memory MD log can include the actual MD update. In contrast, for the non-preferred node for the particular LUN, each such MD page modification can be recorded using an entry in the non-preferred node's in-memory MD log where the entry includes a reference or pointer to the persisted copy of the MD page delta or change as stored in the persisted MD log in the non-volatile memory.

As another variation in at least one embodiment, each node can be assigned a designation of preferred or non-preferred with respect to a particular LUN based on current configuration settings specified by the host or client sending I/Os to the particular LUN. The current configuration settings can indicate for each particular LUN which one or more nodes are preferred, if any and which one or more nodes are non-preferred, if any. The current settings can be specified automatically on the host or client side (e.g., such as by multipathing software on the host or client), and/or can be user-specified.

As yet another variation in at least one embodiment, each node can be assigned a designation of preferred or non-preferred with respect to a particular LUN based on current statistical information regarding the amount or percentage of I/O workload directed to the particular LUN as sent to each of the nodes. The I/O workload can be measured using any suitable one or more metrics such as, for example, one or more of: an amount, percentage or rate of observed I/Os (e.g., I/Os per second); an amount, percentage or rate of data throughput (e.g., megabytes/second); and the like. For example, in at least one embodiment, a node can be designated as preferred with respect to a particular LUN if more than a specified threshold percentage or amount of the I/O workload directed to the particular LUN is sent to the node. In such an embodiment depending on the specified threshold, both nodes of a dual node appliance can be designated as preferred nodes at a first point in time and can accordingly record any MD page changes or deltas in the in-memory MD logs of both nodes when servicing write I/Os for the LUN. Subsequently at a second point in time, the proportion or amount of I/O workload directed to each of the two nodes in the appliance can change such that a first node receives more than the specified threshold percentage or amount of I/O workload directed to the LUN and such that a second node receives less than the specified threshold amount or percentage of I/O workload directed to the LUN. In this latter case at the second point in time, only the first node may be designated as a preferred node for the LUN and the other peer node, the second node, may be designated as a non-preferred node for the LUN. When servicing write I/Os directed to the LUN where servicing the write I/Os includes making one or more MD page modifications, each such MD page modification can be recorded as a MD page delta or change in an entry of the preferred node's in-memory MD log. The entry in the preferred node's in-memory MD log can include the actual MD update. In contrast, for the non-preferred node for the particular LUN, each such MD page modification can be recorded using an entry in the non-preferred node's in-memory MD log where the entry includes a reference or pointer to the persisted copy of the MD page delta or change as stored in the persisted MD log in the non-volatile memory. In such an embodiment, the per node designation of preferred or non-preferred for a particular LUN can be dynamic and adaptive based on the changing observed I/O workload behavior with respect to the amount or percentage of I/O workload of the LUN sent to each of the nodes of the appliance.

As yet another variation in at least one embodiment, each node can be assigned a designation of preferred or non-preferred with respect to a particular LUN based on a combination of criteria, inputs and/or techniques some of which are noted above. For example, the criteria or inputs can include two or more of the following: the current statistical information regarding the amount, percentage, or throughput of observed I/Os or I/O workload (e.g., data throughput rate) directed to the particular LUN as sent to each of the nodes, the current configuration settings specified by the data storage system, the current configuration settings specified by the host, and/or designation of a preferred node/non-preferred node on a per write I/O basis for the LUN whereby the node which receives the I/O can be designated as the preferred node when servicing the particular write I/O and the remaining peer node can be designated as the non-preferred node when servicing the particular write I/O. In such an embodiment, the two or more criteria or inputs can each be assigned a different weighting factor such as different percentage or weight used in combining the two or more inputs in connection with determining a designation of preferred or non-preferred for each node with respect to a particular LUN. For example, an embodiment can combine the current configuration settings as specified by the host and/or data storage system with the current statistical information regarding a percentage or amount of the observed I/O workload of the LUN directed to each node to determine a designation of preferred or non-preferred for each node. For example, a first node can be 1) designated as non-preferred for the LUN by the host or data storage system configuration settings; and 2) designated as preferred for the LUN based on current statistical information where the same first node has an observed I/O workload for the LUN that exceeds a specified threshold such as specified percentage of the total I/O workload for the LUN. In this latter case, assume the current statistical information is given a greater weight than the data storage system configuration settings whereby the first node is designated as preferred for the LUN. When servicing write I/Os directed to the LUN where servicing the write I/Os includes making one or more MD page modifications, each such MD page modification can be recorded as a MD page delta or change in an entry of the preferred first node's in-memory MD log. The entry in the preferred first node's in-memory MD log can include the actual MD update rather than a pointer or reference to the persisted MD page delta or change as stored in the persisted MD log in the non-volatile memory of the system.

The foregoing and other aspects of the techniques of the present disclosure are described in more detail in the following paragraphs.

Referring to the FIG. 1, shown is an example of an embodiment of a SAN10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
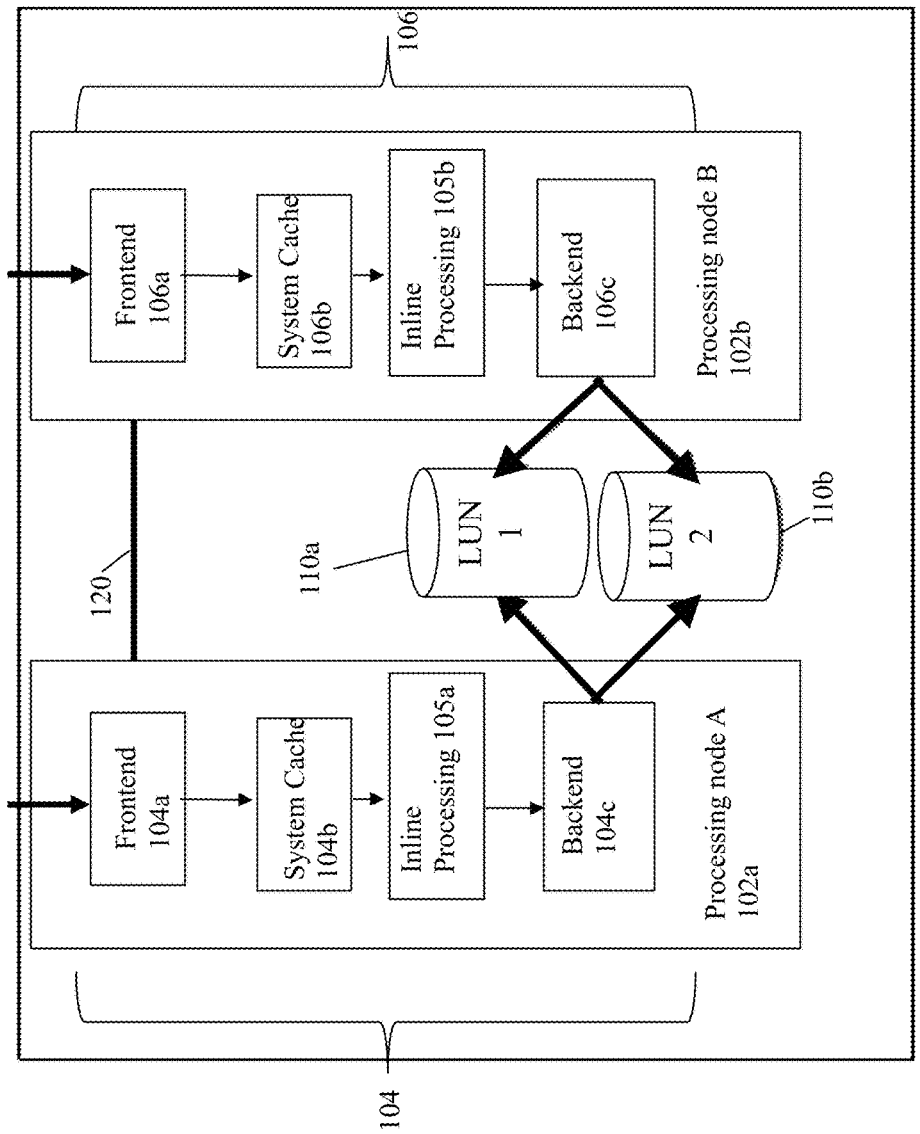
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110*a,* 110*b,* stored in the system cache and then returned to the host.

If the requested read data block is not stored in its original form, the original form of the read data block is recreated and stored in the system cache in its original form so that it can be returned to the host. Thus, requested read data stored on physical storage 110*a,* 110*b* can be stored in a modified form where processing is performed by 105*a* to restore or convert the modified form of the data to its original data form prior to returning the requested read data to the host.

Also illustrated in FIG. 2 is an internal network interconnect 120 between the nodes 102*a,* 102*b.* In at least one embodiment, the interconnect 120 can be used for internode communication between the nodes 102*a,* 102*b.*

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a,* 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b,* and the node B 102*b* is the peer node of the node A 102*a.*

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2, for write operations, latency can be affected by the amount of time taken to store the write data in the log where the write data is visible to both nodes or controllers of the system.

Consistent with other discussion herein, the log file can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
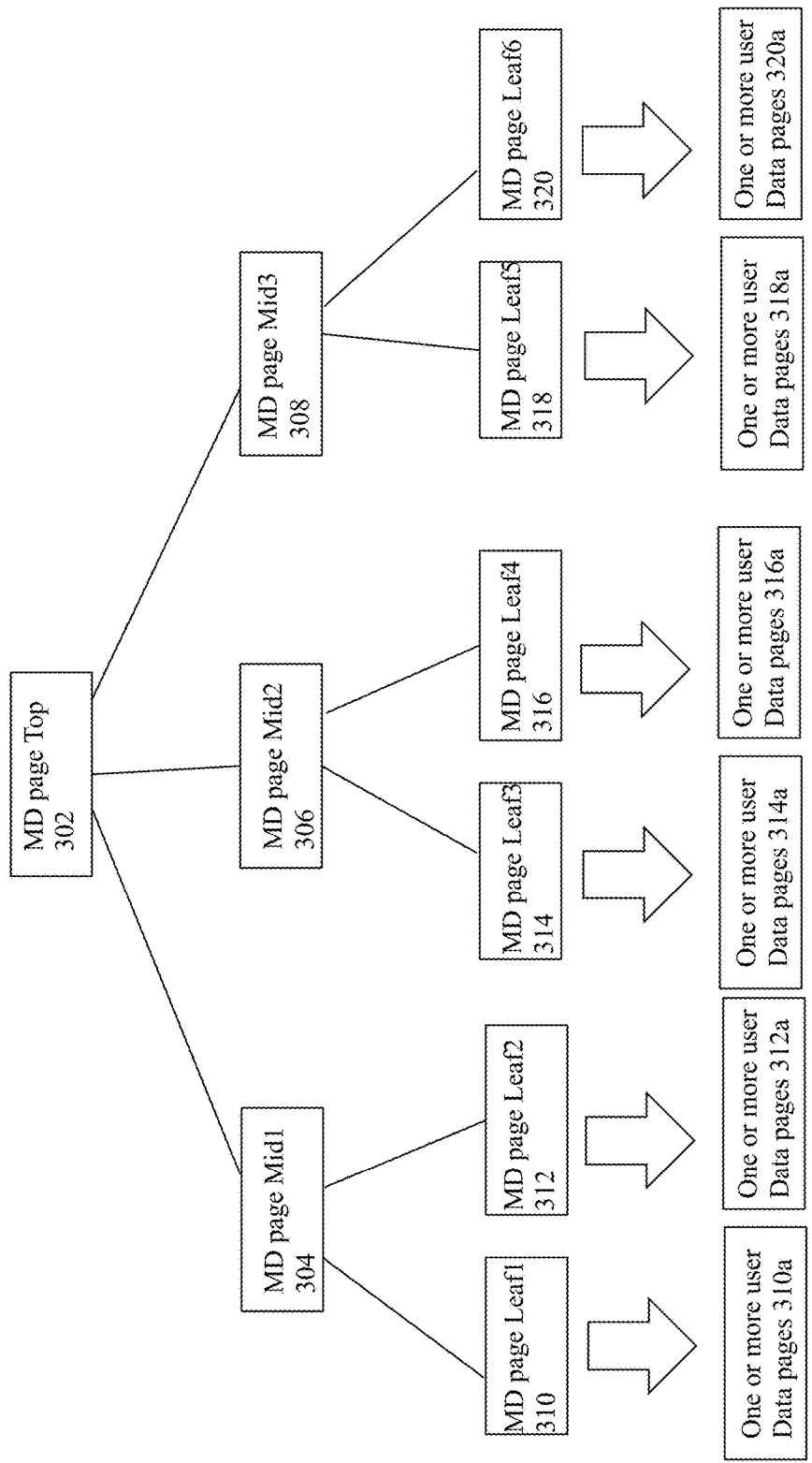
FIGS. 3, 4, 5, and 6 are examples of mapping information in the form of a metadata structure that can be used in connection with mapping logical addresses to physical addresses or storage locations in an embodiment in accordance with the techniques of the present disclosure.

In at least one embodiment, the mapping structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310*a*, 312*a*, 314*a*, 316*a*, 318*a* and 320*a* include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310*a*, 312*a*, 314*a*, 316*a*, 318*a* and 320 each include user data stored on particular logical addresses of the LUN A's logical address space. It may be, for example, that element 310*a* includes user data stored at a first set of LBAs 0-511; and that element 312*a* includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310*a* denotes data pages for LBAs 0-511; the element 312*a* denotes data pages for the LBAs 512-1023; the element 314*a* denotes data pages for LBAs 1024-1535; the element 316*a* denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
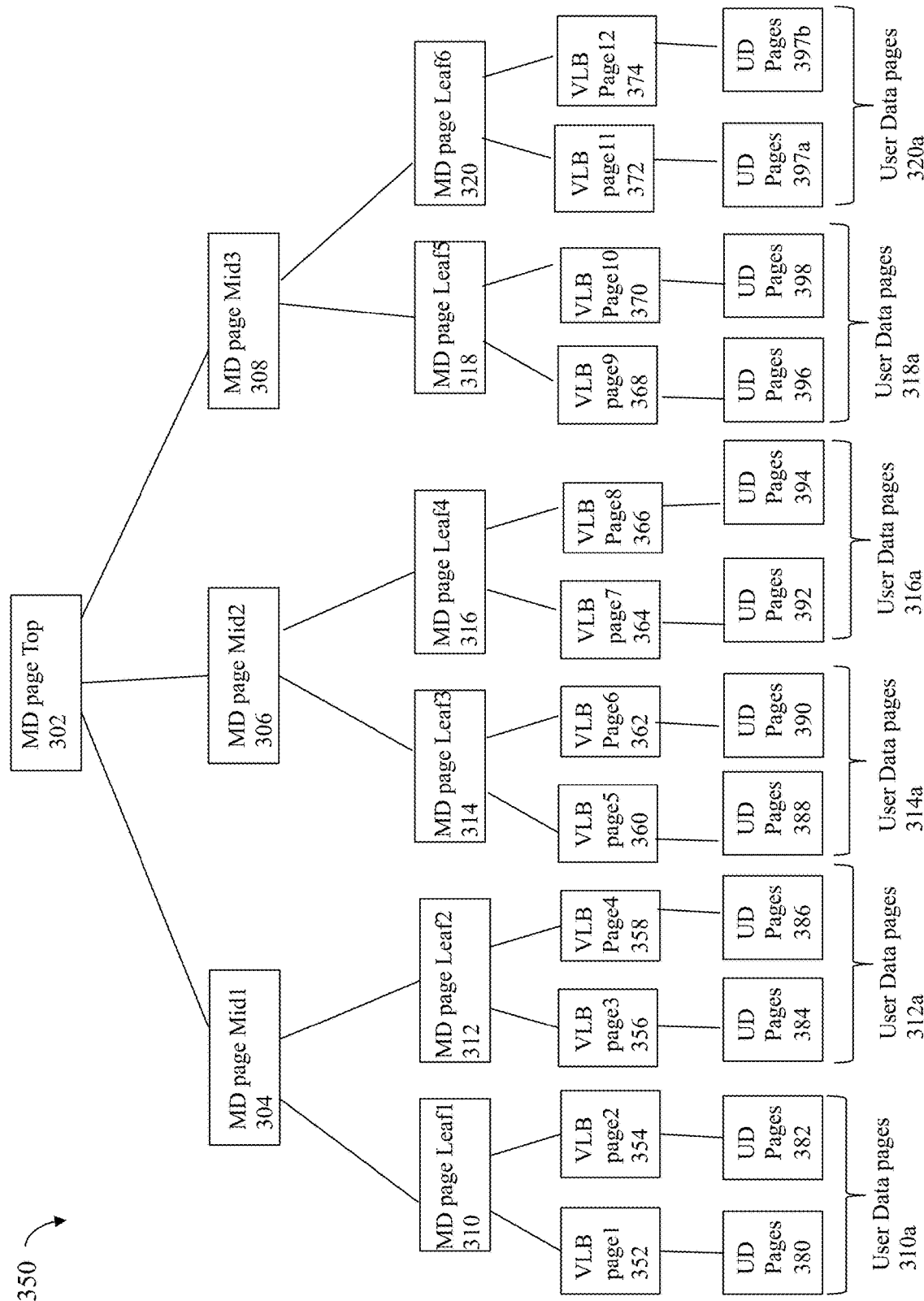

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
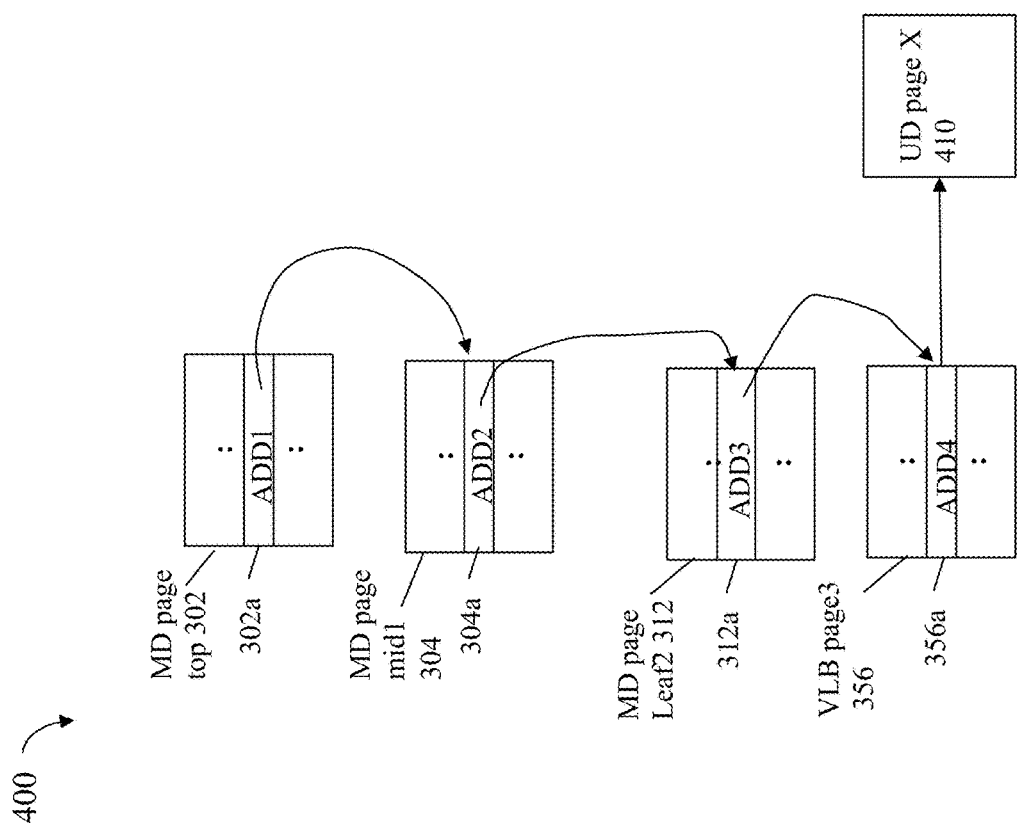

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a.

If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
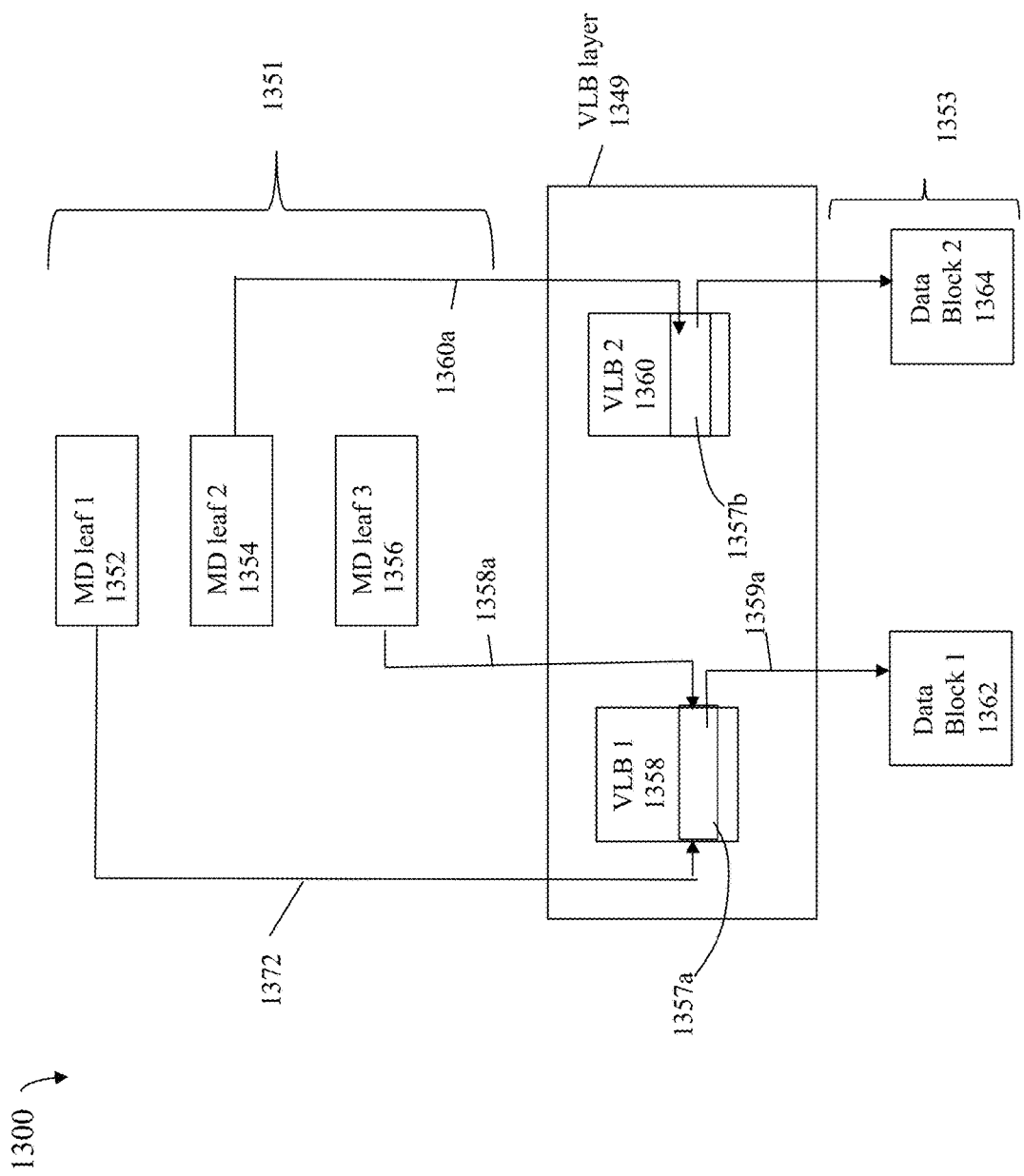

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include a pointer to, or address of, the user data block 1362.

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include a pointer to, or address of, the user data block 1362.

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include a pointer to, or address of, the user data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6. In at least one embodiment, the MD or mapping information used in connection with stored user data can y be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In a dual node data storage system, although both nodes can service I/Os to the same LUN or volume, consistent with other discussion herein, it can be advantageous in some ALUA-based implementations to define optimized paths and non-optimized paths for a particular LUN so that all optimized paths for the LUN are to only a single node of the dual node system and that all non-optimized paths for the LUN are to the other remaining node of the dual node system. Thus in such an ALUA-based configuration with a dual node appliance or data storage system, it can be expected that generally or primarily only a single one of the nodes associated with all the optimized paths for a LUN services I/Os for the LUN.

Described in the following paragraphs are techniques which provide for a more efficient use of the volatile memories of the nodes of the data storage system or appliance. In particular, the techniques of the present disclosure provide for more efficient use of the in-memory metadata logs of the nodes. In particular, in such ALUA-based configurations as noted above, all optimized paths for a particular LUN can be to a single one of the nodes, where the single one of the nodes can be expected to be the primary or preferred node servicing I/Os for the LUN. In at least one embodiment with an ALUA-based configuration, the techniques of the present disclosure can assume that a node receiving I/Os for a particular LUN is currently the primary or preferred node for the LUN, where the LUN's primary or preferred node is expected to primarily receive and service I/Os for the particular LUN. In a dual node system in at least one embodiment, the primary or preferred node with respect to the particular LUN can generally be expected to receive all or most of the I/Os directed to the particular LUN, and the remaining non-primary or non-preferred peer node can generally be expected to receive none or very few of the I/Os directed to the particular LUN.

In at least one embodiment, the primary or preferred node for a particular LUN can store in its in-memory metadata log of its volatile memory the changes or deltas with respect to MD pages used to access user data stored on the particular LUN. In at least one embodiment, the MD pages can include one or more MD pages which are used exclusively when accessing user data stored on only the particular LUN, whereby the one or more MD pages may not be used when accessing user data stored on any other LUN. In this case, the one or more MD pages can be characterized as owned exclusively by the particular LUN. In such an embodiment the non-primary or non-preferred peer node for the particular LUN may not store in its volatile memory the changes or deltas with respect to the one or more MD pages used to access user data stored on only the particular LUN. Rather the non-primary or non-preferred peer node can use a different technique to record in its in-memory metadata log stored in its volatile memory the changes or deltas for the one or more MD pages owned by the particular LUN. The different technique used by the non-primary or non-preferred peer node can consume less volatile memory in comparison to the amount of volatile memory consumed for recording the MD pages changes or deltas on the primary or preferred node's volatile memory.

In at least one embodiment the primary or preferred node for a LUN which uses MD pages to access data stored on the LUN can use a first technique for metadata changes to such MD pages that records the actual MD page change or delta in its in-memory metadata log of the node's volatile memory. In contrast, the non-primary or non-preferred peer node for the LUN can use a second different technique that records a reference or pointer to a persisted copy of the MD page change or delta in its in-memory metadata log of the node's volatile memory The second technique used by the non-preferred peer node consumes less volatile memory than the first technique of the primary or preferred node to record a MD page change or delta in a node's in-memory metadata log of the node's volatile memory. In the unexpected infrequent case where the non-preferred peer node for a LUN receives I/Os directed to the LUN, the non-preferred peer node can receive and service the I/Os for the particular LUN such as using at least a first of the one or more MD pages used exclusively for, and owned by, the particular LUN. Assume that the non-preferred peer node's in-memory metadata log includes MD page changes recorded for the first MD page using the second technique where such records include a pointer or reference to the actual metadata update or change as stored in the persisted metadata log. In this case when servicing the I/Os for the particular LUN, the non-preferred peer node can retrieve any actual MD page changes or deltas needed for the first MD page using the references or pointers to the persisted copy of the MD page changes or deltas for the first MD page, where such references or pointers to the persisted copy of the MD page changes are recorded in entries of the non-preferred peer node's in-memory metadata log. The non-preferred peer node may need such MD page changes or deltas for the first MD page, for example, when constructing a current version of the first MD page for destaging, in order to service a received I/O for the particular LUN for which the remaining node is the preferred or primary node, and possibly other scenarios. Thus, in at least one embodiment, the second technique used by the non-preferred peer node with respect to a particular LUN can consume less node-local volatile memory to store the MD page changes or deltas than the first technique. However, in at least one embodiment, the second technique can result in an increased latency (in comparison to using the first technique) should the non-preferred peer node need to access the actual MD page change or delta using the reference or pointer to the persisted copy of the MD page change or delta. In at least one embodiment, the preferred or primary node for the particular LUN can use the above-noted first technique in connection with recording, in the volatile memory of the preferred node, changes or deltas to MD pages used in connection with accessing data for the particular LUN. The particular LUN can also exclusively own at least one or more of the MD pages used to access data of the LUN. In at least one embodiment, the non-preferred peer node for the particular LUN can use the above-noted second technique in connection with recording, in the volatile memory of the non-preferred peer node, changes or deltas to the one or more MD pages used in connection with exclusively accessing data for only a single LUN, the particular LUN, which exclusively owns the one or more MD pages.

In at least one embodiment, at least some MD pages can be used in connection with accessing data of multiple LUNs where such MD pages are not exclusively used to access data for only a single LUN, and where such MD pages can be characterized as shared by multiple volumes or LUNs. In at least one embodiment, the first technique can be used by both nodes in connection with recorded metadata changes for the MD pages that are shared by multiple volumes or LUNs and thus used in accessing user data stored on such multiple volumes or LUNs.

In at least one embodiment in a dual node data storage system or appliance, a designation of preferred or non-preferred can be applied to each node with respect to a particular LUN. A node designated as a preferred node with respect to a particular LUN can mean that, for write I/Os directed to the particular LUN where servicing the write I/Os includes making one or more MD page modifications, each such MD page modification can be recorded as a MD page delta or change in an entry of the preferred node's in-memory MD log. The entry in the preferred node's in-memory MD log can include the actual MD update. In contrast, a node can be designated as a non-preferred node with respect to a particular LUN. For the non-preferred node for the particular LUN, each such MD page modification can be recorded using an entry in the non-preferred node's in-memory MD log where the entry includes a reference or pointer to the persisted copy of the MD page delta or change as stored in the persisted MD log in the non-volatile memory.

The foregoing and other aspects of the techniques of the present disclosure are described in more detail in the following paragraphs.

At least one embodiment in accordance with the techniques herein can be an ALUA-based configuration as will now be described in more detail below in connection with FIG. 7A.

In an embodiment described herein, the data storage system can be a SCSI-based system such as SCSI-based data storage array. An embodiment in accordance with the techniques herein can include one or more hosts and one or more data storage systems which operate in accordance with the SCSI ALUA standard. ALUA allows the host and/or data storage system to set a LUN's access state with respect to a particular initiator port and the target port. Thus, in accordance with the ALUA standard, various access states (also sometimes referred to herein as ALUA states or path states) can be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN).

A recognized path (such as recognized by a host as a result of discovery processing) over which I/Os (e.g., read and write I/Os) can be issued to access data of a LUN can have an "active" state, such as active-optimized or active-non-optimized. Active-optimized is an active path to a LUN that is preferred over any other path for the LUN having an "active-non optimized" state. A path for a particular LUN having the active-optimized path state can also be referred to herein as an optimized or preferred path for the particular LUN. Thus active-optimized denotes a preferred path state for the particular LUN. A path for a particular LUN having the active-non optimized (or unoptimized) path state can also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host can select to send I/Os to a LUN from those paths having an active-optimized state for the LUN. The host can proceed to use a path having an active non-optimized state for the LUN only if there is no active-optimized path for the LUN. A recognized path over which I/Os cannot be issued to access data of a LUN can have an "unavailable" state. When a path to a LUN is in the unavailable state, a limited set of non-I/O-based commands (e.g. other than read and write commands to, respectively, read and write user data), such as the SCSI INQUIRY, can be issued. It should be noted that such limited set of non I/O based commands can also be issued over an active (e.g., active optimized and active non-optimized) path as well.

Figure 7A:
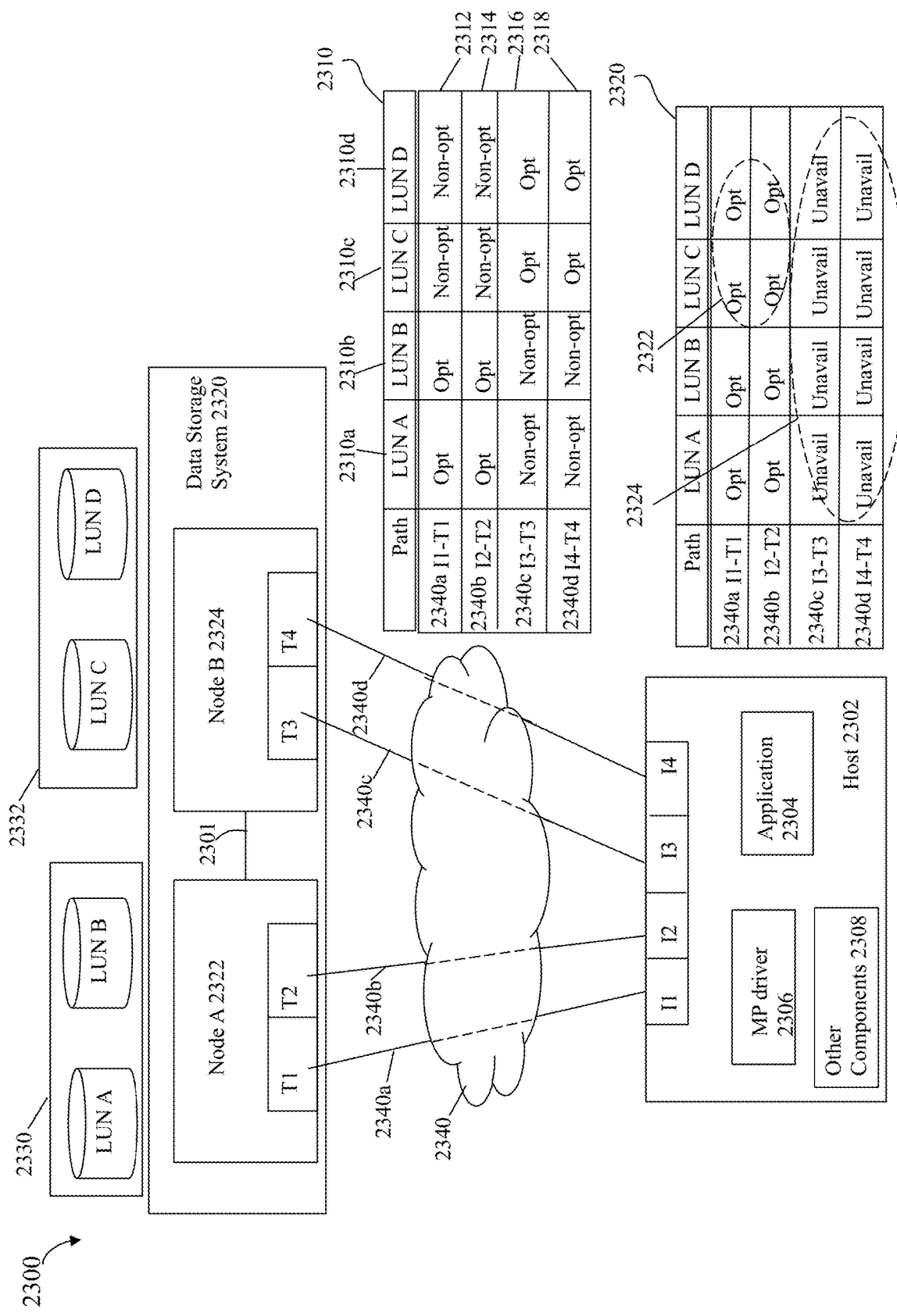
FIG. 7A is an example illustrating various path access states that can be set in an embodiment in accordance with the techniques of the present disclosure.

Referring to FIG. 7A, shown is an example of an embodiment of a system that can be utilized in connection with the techniques of the present disclosure. The example 2300 includes a host 2302, a network 2340 and a data storage system 2320. The host 2302 and the data storage system 2320 can communicate over one or more paths 2340*a-d* through the network 2340. The paths 2340*a-d* are described in more detail below. The LUNs A and B are included in the set 2330, and the LUNs C and D are included in the set 2332. The LUNs of the sets 2330 and 2332 are configured from non-volatile BE storage PDs of the data storage system 2320. The data storage system includes two nodes—node A2 322 and node B 2324. The nodes 2322, 2324 can be as described elsewhere herein. The element 2301 denotes an internode communication connection similar, for example, to the connection 120 of FIG. 2. Consistent with other discussion herein such as in connection with FIG. 2, the BE PDs from which storage is provisioned for the LUNs of 2330, 2332 are accessible to both the nodes 2322, 2324.

The host 2302 can include an application 2304, a multi-path (MP) driver 2306 and other components 2308. The other components 2308 can include, for example, one or more other device drivers, an operating system, and other code and components of the host. An I/O operation from the application 2304 can be communicated to the data storage system 2320 using the MP driver 2306 and one or more other components of the data path or I/O path. The application 2304 can be a database or other application which issues data operations, such as I/O operations, to the data storage system 2320. Each of the I/O operations can be directed to a LUN, such as one of the LUNs of 2330, 2332, configured to be accessible to the host 2302 over multiple physical paths. As such, each of the I/O operations can be forwarded from the application 2304 to the data storage system 2320 over one of the possible multiple paths.

The MP driver 2306 can include functionality to perform any one or more different types of processing such as related to multipathing. For example, the MP driver 2306 can include multipathing functionality for management and use of multiple paths. For example, the MP driver 306 can perform path selection to select one of the possible multiple paths based on one or more criteria such as load balancing to distribute I/O requests for the target device across available active-optimized or preferred paths. In some embodiments, host side load balancing can be performed by the MP driver to provide for better resource utilization and increased performance of the host, data storage system, and network or other connection infrastructure. The host 2302 can also include other components 2308 such as one or more other layers of software used in connection with communicating the I/O operation from the host to the data storage system 2320. For example, element 2308 can include Fibre Channel (FC) and SCSI drivers, a logical volume manager (LVM), and the like. It should be noted that element 2308 can include software or other components used when sending an I/O operation from the application 2304 where such components include those invoked in the call stack of the data path above the MP driver 2306 and also below the MP driver 2306. For example, application 2304 can issue an I/O operation which is communicated in the call stack including an LVM, the MP driver 2306, and a SCSI driver.

The data storage system 2320 can include one or more BE PDs configured to store data of one or more LUNs. Each of the LUNs 2330, 2332 can be configured to be accessible to the host 2302 through multiple paths. The node A 2322 in this example has two data storage system target ports T1 and T2. The node B 2324 in this example has two data storage system target ports T3 and T4. The host 2302 includes 4 host initiator ports I1, I2, I3 and I4. The path 2340*a* is formed using the endpoints I1 and T1 and can be denoted as I1-T1. The path 2340*b* is formed using the endpoints I2 and T2 and can be denoted as I2-T2. The path 2340*c* is formed using the endpoints I3 and T3 and can be denoted as I3-T3. The path 2340*d* is formed using the endpoints I4 and T4 and can be denoted as I4-T4.

In this example, all of the LUNs A, B C and D can be accessible or exposed over all the data storage system target ports T1, T2, T3 and T4 over the paths 2340*a-d*. As described in more detail below, a first set of paths to the node A 2322 can be specified as active-optimized or preferred for the LUNs of the set 2330 and a second set of paths to the node B 2324 can be specified as active-optimized or preferred for the LUNs of the set 2332. Additionally the first set of paths to the node A 2322 can be specified as active-non optimized or non-preferred for the LUNs of the set 2332 and the second set of paths to the node B 2324 can be specified as active-non optimized or non-preferred for the LUNs of the set 2330.

The multiple active paths allow the application I/Os to the LUNs A, B C and D to be routed over the multiple paths 2340*a-d* and, more generally, allow the LUNs A, B C and D to be accessed over the multiple paths 2340*a-d*. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN can be used to send the I/Os to the particular LUN. Thus, an embodiment of the MP driver 2306 can also perform other processing in addition to load balancing in connection with path selection. The MP driver 2306 can be aware of, and can monitor, all paths between the host and the LUNs A, B C and D in order to determine that particular state of such paths with respect to the various LUNs. In this manner, the MP driver can determine which of the multiple paths over which a LUN is visible can be used for issuing I/O operations successfully. Additionally, the MP driver can use such information to select a path for host-data storage system communications issued to the particular LUN.

In the example 2300, each of the LUNs A, B C and D can be exposed through the 4 paths 2340*a-d*. As described in more detail below, each of the paths 2340*a-d* can have an associated ALUA state also used by the host when issuing I/O operations. Each of the paths 2340*a-d* can be represented by two path endpoints—a first endpoint on the host 2302 and a second endpoint on the data storage system 2320. The first endpoint can correspond to a port of a host component, such as a host bus adapter (HBA) of the host 2302, and the second endpoint can correspond to a target port of a data storage system component, such as a target port of a node of the data storage system 2320. In the example 2300, the elements I1, I2, I3 and I4 each denote a port of the host 2302 (e.g. such as a port of an HBA), and the elements T1, T2 T3 and T4 each denote a target port of a node of the data storage system 2320.

The MP driver 2306, as well as other components of the host 2302, can execute in kernel mode or other privileged execution mode. In one embodiment using a Unix-based operating system, the MP driver 2306 can execute in kernel mode. In contrast, the application 2304 can typically execute in user mode, or more generally, a non-privileged execution mode. Furthermore, it will be appreciated by those skilled in the art that the techniques herein can be used in an embodiment having any one of a variety of different suitable operating systems including a Unix-based operating system as mentioned above, any one of the Microsoft Windows® operating systems, a virtualized environment using hypervisors and virtual machines, and the like.

In operation, the application 2304 can issue one or more I/O operations (e.g., read and write commands or operations) directed to the LUNs 330, 332 of the data storage system. Such I/O operations from the application 3204 can be directed to the MP driver 306 after passing through any intervening layers of the data or I/O path.

In connection with the SCSI standard, a path can be defined between two ports as described above. A command can be sent from the host (as well as a component thereof such as a HBA) and can be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path can be between a first endpoint which is an initiator port (e.g., I1) of the host and a second endpoint (e.g., T1) which is a target port of node in the data storage system. Over each such path, one or more LUNs can be visible or exposed to the host initiator through the target port of the data storage system.

In connection with some protocols such as the SCSI protocol, each path as related to sending and receiving of I/O commands can include 2 endpoints. As discussed herein, the host, or port thereof, can be an initiator with respect to I/Os issued from the host to a target port of the data storage system. In this case, the host and data storage system ports are examples of such endpoints. In the SCSI protocol, communication can be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system can be directed to a LUN and a logical address or location in the LUN's logical address space. The logical address or location of the LUN can be characterized as the target logical address of the I/O operation. The target logical address or location of the I/O operation can identify a LBA within the defined logical address space of the LUN. The I/O command can include various information such as identify the particular type of I/O command as read or write, identify the target logical address (e.g., LUN and LUN logical address) of the I/O command, and other information. In connection with servicing the I/O operation, the data storage system can map the target logical address to a physical storage location on a PD of the data storage system. The physical storage location can denote the physical storage allocated or provisioned and also mapped to the target logical address.

In an embodiment described herein, the data storage system 2320 can be a SCSI-based system such as SCSI-based data storage array operating in accordance with the ALUA standard. As described herein, a data storage system in accordance with techniques herein can set an access path state for a particular LUN over a particular path from an initiator to a target of the data storage system. For example, the data storage system can set an access path state for a particular LUN on a particular path to active-optimized (also referred to herein as simply "optimized" or "preferred") to denote the path as a preferred path for sending I/Os directed to the LUN. The data storage system can set an access path state for a particular LUN on a particular path to active-non optimized (also referred to herein as simply "non-optimized" or "non-preferred") to denote a non-preferred path for sending I/Os directed to the LUN sent. The data storage system can also set the access path state for a particular LUN on a particular path to other suitable access states. Although discussion herein may refer to the data storage system setting and modifying the path access states of the paths between the host and the data storage system, in some embodiments, a host and/or a user can also set and/or modify the path access states which are then communicated to the data storage system.

In accordance with the techniques herein, the data storage system can set the path state for a particular LUN to preferred or non-preferred for any suitable purpose. In at least one embodiment, multipathing software, such as the MP driver, on the host can monitor the particular access path state as can be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system can vary the associated access state of each such path in order to vary and control the particular ones of the multiple paths over which the host can issue I/Os to the LUN.

The element 2330 indicates that the LUN A and the LUN B are exposed to the host 2302 over preferred paths to the node A 2322 and non-preferred paths to the node B 324. The element 2332 indicates that the LUN C and the LUN D are exposed to the host 2302 over preferred paths to the node B 2324 and non-preferred paths to the node A 2322. Thus, the paths 2340c-d to the target ports T3 and T4 of node B 2324 are set to optimized or preferred for the LUNs C and D and set to non-optimized or non-preferred for the remaining LUNs A and B; and the paths 2340a-b to the target ports T1 and T2 of node A 322 are set to preferred or optimized for the LUNs A and B and set to non-optimized or non-preferred for the remaining LUNs C and D.

In at least one embodiment, target ports are given identifiers and can be organized into target port groups (TPGs). In at least one embodiment, a TPG can be defined as a logical grouping or collection of one or more target port identifiers that share the same access characteristics for a particular LUN. For example, target ports T1 and T2 can be included in a first TPG and target ports T3 and T4 can be included in a second TPG. With ALUA in at least one embodiment, a LUN can be visible with respect to the entire TPG rather than on a port level basis. In other words, a LUN can be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above can include all target ports of one of the nodes such as node A 2322 over which the LUNs A, B, C and D are exposed; and the second TPG noted above can include all target ports of one of the nodes such as node B 2324 over which the LUNs A, B, C and D are exposed.

The table 2310 denotes the different path states for each of the 4 paths for the 4 LUNs A, B, C and D. The table 2310 reflects the path states as discussed above. The row 2312 indicates that path I1-T1 including the target port T1 of node A 2322 is active optimized (opt) or preferred for the LUNs A and B and active non-optimized (non-opt) or non-preferred for the LUNs C and D. The row 2314 indicates that path I2-T2 including the target port T2 of node A 2322 is optimized (opt) or preferred for the LUNs A and B and non-optimized (non-opt) or non-preferred for the LUNs C and D. The row 2316 indicates that path I3-T3 including the target port T3 of node B 2324 is optimized (opt) or preferred for the LUNs C and D and non-optimized (non-opt) or non-preferred for the LUNs A and B. The row 2318 indicates that path I4-T4 including the target port T4 of node B 2324 is optimized (opt) or preferred for the LUNs C and D and non-optimized (non-opt) or non-preferred for the LUNs A and B.

Assume further, for example, the node B 324 of the data storage system 2320 now experiences a failure so that the target ports T3 and T4 and thus the paths 2340c, 2340d are unavailable. In response to the failure of the node B 2324 and the target ports T3 and T4, the path states can be updated from the states of the table 310 to the revised path states of the table 2320. In the table 2320, due to the failure and unavailability of the paths 2340c-d, 1) the path states of 2322 indicate that the path 3240a I1-T1 and the path 2340b I2-T2 have transitioned from the non-optimized to the optimized or preferred path state for the LUNs C and D; and 2) the path states of 2324 indicate that the path I3-T3 2340c and the path 2340d I4-T4 for the LUNs A, B, C and D have transitioned to the unavailable state.

It is noted that other embodiments can have different path state changes than as denoted by the table 2320.

In at least one embodiment in accordance with the techniques herein in accordance with the ALUA standard, the host 2302 can issue commands to the data storage system 2320 to discover the particular ALUA path states associated with the various paths exposing the different LUNs 2330, 2332 to the host 2302. For example, the host 2302 can issue the report target port group (RTPG) command over the different paths exposing a particular LUN to determine the particular ALUA path state of each of the paths with respect to the particular LUN.

In at least one embodiment, the host 2302 can be notified regarding changes to ALUA path stages for LUNs exposed to the host 2302 by the data storage system. For example, the host 2302 can be notified regarding the ALUA path state changes or transitions illustrated by the table 2320.

In at least one embodiment, the data storage system 2320 can set the ALUA path states, for example, as illustrated by the table 2310 so that the host 2302 sends all I/Os directed to a particular LUN to a single one of the nodes of the system 2320. Path state changes can be made subsequently as needed, for example, in response to path failures such as described above in connection with the table 2320.

In at least one embodiment in accordance with the techniques of the present disclosure, the ALUA path states for paths for each exposed LUN can be specified so that all optimized or preferred paths for a single LUN only go to a single node as illustrated in the table 2310. For example with reference to FIG. 7A and the table 2310, under normal operating conditions, all optimized or preferred paths for the LUNs A and B 2330 are only to the node A 2322, and all optimized or preferred paths for the LUNs C and D 2332 are only to the node B 2324. Based on the information in the table 2310, the node A 2322 can be designated as preferred for the LUNs A and B 2330, the node B 2324 can be designated as non-preferred for the LUNs A and B 2330, the node A 2322 can be designated as non-preferred for the LUNs C and D 2332, and the node B 2324 can be designated as preferred for the LUNs C and D 2332. Consistent with other discussion herein, the ALUA preferred path states for a particular LUN can be specified to denote a node to volume or node to LUN affinity, where the node for which a LUN has an affinity is a preferred node for the LUN. Generally, the use of ALUA preferred or optimized path states is one way or one of possibly multiple different criteria that can be used to specify node to LUN or volume affinity for a preferred node for the particular LUN.

Based on the ALUA preferred or optimized path states for each LUN such as illustrated in the table 2310 of the FIG. 7A, it can be expected, for example, that under normal operating conditions, the host 2302 will send all I/Os for the LUNs A and B to the node A 2332, and send all I/Os for the LUNs C and D to the node 2324.

At least one embodiment in accordance with the techniques herein can use various structures, organizations and other techniques as described, for example, in U.S. patent application Ser. No. 16/260,660, SYSTEM AND METHOD FOR AGGREGATING METADATA CHANGES IN A STORAGE SYSTEM, Shveidel et al., now U.S. Patent Publication 2020/0241793A1, published Jul. 30, 2020, (also sometimes referred to herein as the '660 patent application or '660 application) which is incorporated by reference herein in its entirety. Some of the structures and organization as described in the '660 application that can be used in connection with the techniques of the present disclosure are generally described in the following paragraphs.

In at least one embodiment in accordance with the techniques of the present disclosure, a preferred node for a particular LUN can store in the preferred node's in-memory metadata log MD page updates or deltas for one or more MD pages modified in connection with servicing write I/Os for the particular LUN, where such MD page updates or deltas include the actual MD page update or change in a recorded entry of the in-memory metadata log of the preferred node. In at least one embodiment, the MD page updates or deltas as stored in the in-memory metadata log of a preferred node for a particular LUN can be in the form tuples. In at least one embodiment, each metadata update, change or delta made to a MD page when a preferred node is servicing a write I/O for a particular LUN can be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples. In such an embodiment for MD page updates or deltas associated with a non-preferred node for a particular LUN, the tuples or records denoting metadata changes to MD pages can be of a particular type, an RDL reference (RDL ref) type, where such records do not include the actual metadata update or change stored in the entry of the in-memory metadata log of the non-preferred node. Such RLD ref type entries or tuples each rather include a pointer to a corresponding record in the persisted metadata log, where the corresponding record of the persisted metadata log includes the actual metadata change or updated content. In such an embodiment for MD page updates or deltas associated with a preferred node for a particular LUN, the tuples or records denoting metadata changes to MD pages can be of a particular type other than the RDL ref type where such records include the actual metadata update or change. Generally, a tuple or entry for a MD page update for a preferred node for a particular LUN includes the metadata change or updated content as a field of the tuple or entry. In contrast, a tuple or entry for a MD page update for a non-preferred node for a particular LUN does not include the actual metadata change or updated content as a field of the tuple or entry, and rather includes a reference or pointer to a corresponding entry of the persistent metadata log stored on NVRAM which includes the actual metadata change or updated content.

In at least one embodiment in accordance with the techniques of the present disclosure, a non-preferred node for a particular LUN can record, in the non-preferred node's in-memory metadata log, MD page updates or deltas for one or more MD pages modified in connection with servicing write I/Os for the particular LUN, where such MD page updates or deltas are recorded using a new type (e.g., a new T type) of a MD change or delta record, referred to herein sometimes as an RDL ref (reference). In at least one embodiment, the RDL ref can denote a new T type of a tuple where the tuple for an RDL ref type includes a pointer or reference to the MD page update or delta as stored in the persisted metadata log on NVRAM. In this manner, the payload of the V field of the tuple for the RDL ref type can be reduced in size and does not include the actual MD page update or change but can rather include a reference or pointer to another entry in the persisted metadata log on NVRAM, where the other entry of the persisted metadata log includes the actual updated metadata content or change applied to the MD page.

In at least one embodiment, the average size of a tuple or MD delta record stored in an in-memory metadata log for a preferred node for a LUN using non-RDL type tuples or entries can be approximately 9 bytes. The preferred node for a LUN can store MD page changes associated with the particular LUN using a type (T field of the tuple or entry) having a value denoting a type other than the RDL ref type. In contrast, the average size of a tuple or MD delta record of the RDL ref type as stored in an in-memory metadata log for a non-preferred node for a LUN can be approximately 2-4 bytes. In at least one embodiment, a MD page update or change can be recorded in the in-memory metadata log of a non-preferred node using the delta tuple or entry including an LI and EI as described above, and where the entry further includes a T type denoting the RDL ref type, and where the entry further includes a reference or pointer to a corresponding entry in the persisted metadata log on NVRAM. The corresponding entry in the persisted MD log includes the updated metadata content for the MD page having the logical index LI and entry EI.

Figure 7B:
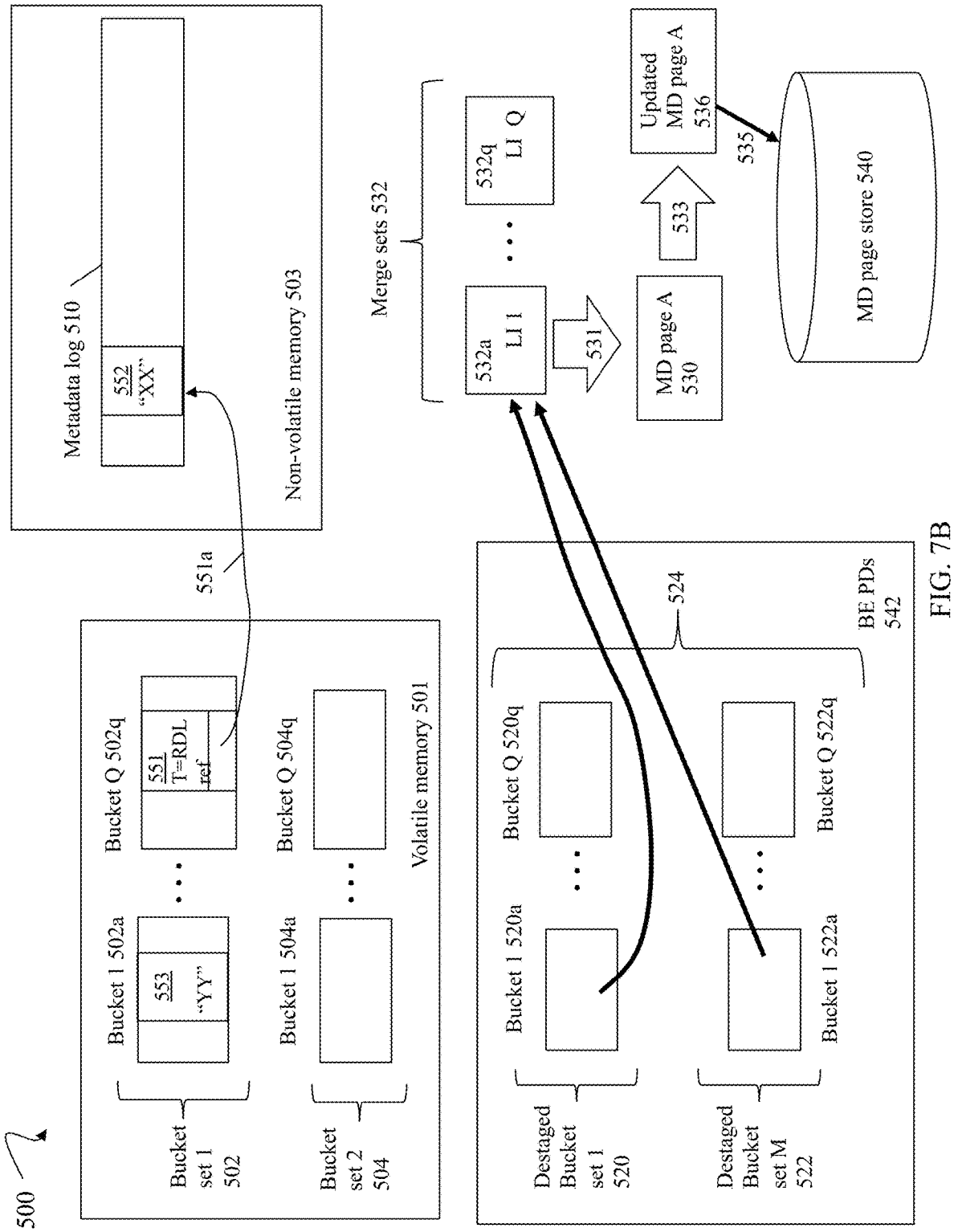
FIG. 7B is an example illustrating structures and associated data flow in an embodiment in accordance with the techniques of the present disclosure.

Referring to FIG. 7B, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page. In at least one embodiment, a non-preferred node for a particular LUN can record associated metadata updates for the particular LUN using tuples or entries having the RDL ref type, or more generally, where such tuples or entries of the non-preferred node's in-memory metadata log include a reference or pointer to the metadata change or updated metadata content as stored in the persisted metadata log 510.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

The element 553 can denote a metadata update represented as a tuple which is stored as an entry in the bucket 1 502a. For example, the element 553 can denote the metadata update U1 noted above which writes or updates an entry or field of the MD page A with the content "YY". In this case, the entry 553 has an associated tuple type T other than RDL ref since the updated metadata content is stored as part of the tuple or entry 553. Additionally, the entry or tuple 553 can represent a MD page update performed by a preferred node for a particular LUN.

The element 551 can denote a metadata update represented as a tuple which is stored as an entry in the bucket Q 502q associated with a particular MD page such as MD page Z. For example, the element 551 can denote a metadata update which writes or updates an entry or field of the MD page Z with the content "XX". In this case, the entry 551 has an associated tuple type, T=RDL ref since the entry 551 includes a pointer or reference 551a to the corresponding entry 552 of the persisted metadata log 510. In this case, the entry 551 does not include the updated metadata content "XX" which is rather stored in the entry 552 of the persistent metadata log 510. Thus, the entry 552 of the persisted metadata log 510 includes the actual updated metadata content "XX" to be stored in the MD page Z. Additionally, the entry or tuple 551 can represent a MD page update recorded by a non-preferred node for a particular LUN. Whenever it may be necessary to obtain the actual updated metadata content "XX" for the MD page Z mapped to the bucket Q 502q, the pointer 551a of the entry 551 can be used to obtain the updated metadata content "XX" from the corresponding entry 552 of the persisted metadata log 510. The pointer 551a can be used to obtain the updated metadata content "XX" from the corresponding entry 552 of the persisted metadata log 510, for example, when constructing a current version of the MD page Z such as in connection with destaging and/or in response to a cache miss where the current version of the MD page Z is not stored in the volatile memory cache of a node. The cache miss can occur, for example, in connection with servicing an I/O operation for a particular LUN received at a node having the local volatile memory 501. The cache miss can occur, for example, in the rare case where the node can be a non-preferred node for the particular LUN but the non-preferred node is receiving the I/O for the particular LUN for servicing by the non-preferred node.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two sets at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in a manner as described in the '660 application or any other suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In connection with the first phase of destaging, any metadata changes, updates or deltas as recorded in tuples or entries of a destaged bucket set having a type of RDL ref can use its reference or pointer to obtain the actual metadata change or update from a corresponding entry of the persisted metadata log 510. For example, assume that the bucket set 502 is being destaged in the first phase of destaging where the bucket set 502 includes the entry 551 in the bucket Q 502q as discussed above. When destaging the entry or tuple 551, the reference or pointer 551a can be used to obtain the actual metadata update or change "XX" as stored in the entry 552 of the persisted metadata log 510. The actual metadata change or update "XX" can be stored in the corresponding location of 524 on the BE PDs 542 used for storing the destaged bucket sets 524. Thus, in at least one embodiment, the destaged metadata changes as stored in the BE PDs 542 as a result of the first phase of destaging include the actual updated metadata content obtained by dereferencing any pointers such as 551a from tuples or entries of in-memory metadata logs of the nodes.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. An entry in an in-memory metadata log structure, such as one of the bucket sets of the volatile memory 501, can be either a tuple for a normal (e.g., non-RDL type) MD page change or delta including the actual updated metadata content, or a tuple which is an RDL ref type including a reference or pointer to an entry of a MD page change of the metadata log 510 stored on the non-volatile memory 503 Thus, for an entry such as 553 of the in-memory metadata log 502 that is a MD page change or delta including the actual metadata update, the corresponding entry of the metadata log 510 denotes the same MD page change or delta. For an entry, such as the entry 551, of the in-memory metadata log 502, that is an RDL-Ref entry, the corresponding entry 552 of the metadata log 510 stored in the NVM 503 is referenced or pointed to (551*a*) by the RDL-Ref entry 551. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542

What will now be described are techniques that can be used in connection with servicing I/Os and reads and writes with respect to metadata of a MD page.

The techniques described in the following paragraphs provide for reading one or more MD pages, or portions thereof. Consistent with other discussion herein, a node can receive an I/O operation, such as a read I/O operation, that reads user data from a target logical address, such as from a LUN and an LBA or offset on the LUN. In connection with processing or servicing the read I/O operation, the node can read metadata from one or more MD pages to obtain the requested read data. The one or more MD pages can be used, for example, to map the target logical address to the corresponding physical storage location of the requested read data. The node can receive an I/O operation, such as a write I/O operation, that writes user data to the target logical address. In connection with processing or servicing the write I/O operation, the node may also need to read metadata from one or more MD pages.

Figure 8:
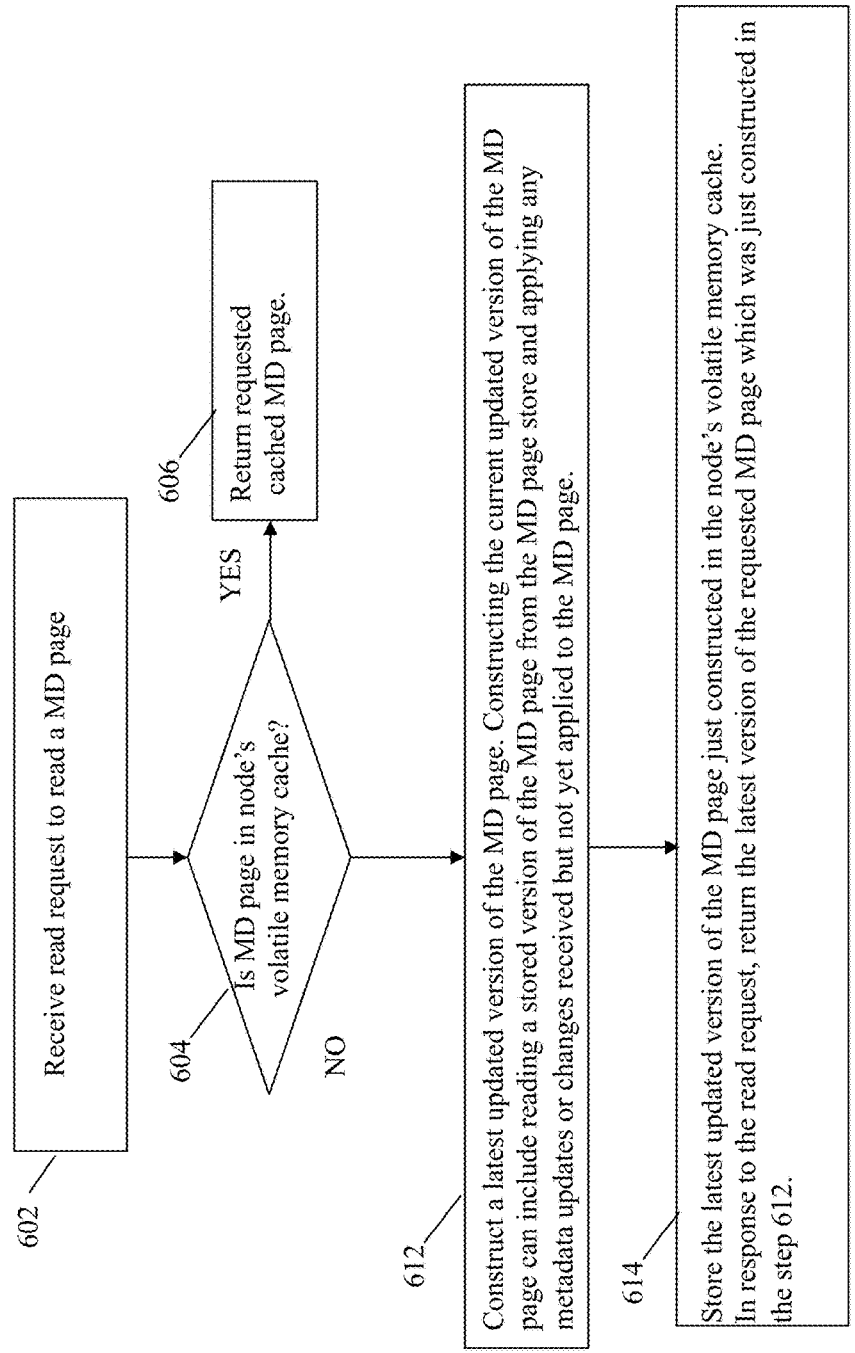

Referring to FIG. 8, shown is a flowchart 600 of processing steps that can be used in connection with servicing a read request to read metadata from a MD page.

At the step, 602 a node may receive a read request for a MD page. From the step 602, control proceeds to the step 604.

At the step 604, a determination is made as to whether the MD page is currently stored in the node's volatile memory cache. If the step 604 evaluates to yes, a read cache hit is determined with respect to the requested MD page. If the step 604 evaluates to no, a read cache miss is determined with respect to the MD page and read cache miss processing can be performed. If the step 604 evaluates to yes, control proceeds to the step 606.

At the step 606, processing is performed to return a response to the read request received in the step 602. Processing of the step 606 can include retrieving the requested MD page from the node's local volatile memory cache MD, and returning the requested MD page in response to the read request.

If the step 604 evaluates to no, control proceeds to the step 612. At the step 612, processing can be performed to construct the latest version of the requested MD page. Constructing the current version of the MD page can include reading a stored version of the MD page from the MD page store of the BE PDs, and applying any metadata updates or changes received but not yet applied to the MD page. The metadata updates for the MD page can be aggregated from the in-memory or volatile memory structures of the node's volatile memory 501 (e.g., the in-memory metadata log from the bucket sets 502, 504 of the volatile memory 501 of the nodes) and also from the BE PDs 542. In particular, the metadata updates for the MD page can be aggregated and merged from the bucket sets 502 and 504 (e.g., the node's in-memory metadata log), and also from the destaged bucket sets 524. The metadata updates for the particular MD page can be retrieved based on the LI uniquely associated with the MD page, where the LI is mapped uniquely to a particular bucket in each of the bucket sets 502, 504, and each of the bucket sets of 524. Consistent with other discussion herein, the metadata updates for the MD page can be aggregated and merged. A stored version of the MD page can be retrieved from the MD page store 540, and the merged metadata updates from the MD page can then be applied to the stored version of the MD page to thereby obtain the latest version of the MD page.

In the step 612 in connection with processing metadata updates having tuples or entries from a particular volatile memory bucket of 501 (e.g., from the in-memory metadata log of the node) for the requested MD page, the volatile memory bucket can include entries or tuples such as 551 denoting an RDL ref type entry. For RDL ref type entries or tuples of the in-memory metadata logs, the actual metadata change or updated metadata content can be obtained using the reference or pointer to the corresponding entry in the persisted metadata log 510. Consistent with other discussion herein, the RDL ref type entry of the node's in-memory metadata log includes the reference or pointer to the corresponding entry in the persisted metadata log 510. For example with reference to FIG. 7B, assume the read request is for metadata page Q that maps to the bucket Q 502*q*. In this case, processing the entry 551 to apply the metadata update denoted by 551 includes using the reference or pointer 551*a* to access the corresponding entry 552 of the persisted metadata log 510, reading the actual metadata update or content "XX" from the entry 552, then applying the update or content "XX" to the metadata page Q as read from the MD page store 540. As noted above, the meta data update "XX" for the MD page Q can be merged, combined and/or aggregated, as may be appropriate, with other metadata updates, if any, from the buckets 502*q*, 504*q* and from any buckets of 524 mapped to the same MD page Q. From the step 612, control proceeds to the step 614.

At the step 614, the latest version of the MD page just constructed can be stored in the node's volatile memory cache. In response to the read request, the latest version of the MD page just constructed and stored in the node's volatile memory cache can be returned.

As discussed above, the full MD page construction (e.g., step 612) to obtain a latest version of the requested MD page can occur when the requested MD page is not located in the node's cache.

What will now be described are techniques that can be performed in an embodiment in accordance with the present disclosure when processing MD page changes or updates for writes to one or more MD pages.

In connection with an active-active appliance or system such as described herein, the nodes should be synchronized to guarantee consistent access and updates of the same data and MD objects or MD pages from both nodes. For example, one particular method or protocol that can be used in connection with performing MD updates to one or more MD pages in at least one embodiment in accordance with the techniques herein is described in some detail herein and in further detail, for example, in U.S. application Ser. No. 17/243,252, filed on Apr. 28, 2021, "System and Method for Consistent Metadata Access Based on Local Locks Semantics in a Multi-Node Cluster", Shveidel, et al., (the '252 application) which is incorporated by reference herein in its entirety. More generally, any suitable technique can be used to synchronize and coordinate access and updates to the MD pages as stored in the in-memory delta logs of the node-local memories, the log stored on NVRAM that can be used to log user data and metadata updates, and the MD page store (e.g., as may be stored on the BE PDs).

The '252 application uses a technique to synchronize access and updates to shared MD pages among the two nodes of an appliance by combining locking and transactional update logic using a single round or message exchange between the two nodes. The general technique described in the '252 application has been adapted for use in connection with the techniques of the present disclosure. Additionally, an embodiment can generally use any suitable protocol in connection with the techniques of the present disclosure to synchronize access and updates to the shared MD pages among the two nodes of the dual node appliance.

What will now be described is processing that can be performed in connection with two nodes of the dual node appliance to synchronize access to one or more MD pages involved in a transaction. Thus, in this context and example described in the following paragraphs, updates to all of the one or more MD pages can be required for the transaction initiated by an initiator. The metadata updates to the one or more MD pages can be performed, for example, in connection with processing a write I/O received by the initiator node which is initiating the transaction of metadata updated applied to the one or more MD pages.

Figure 9B:
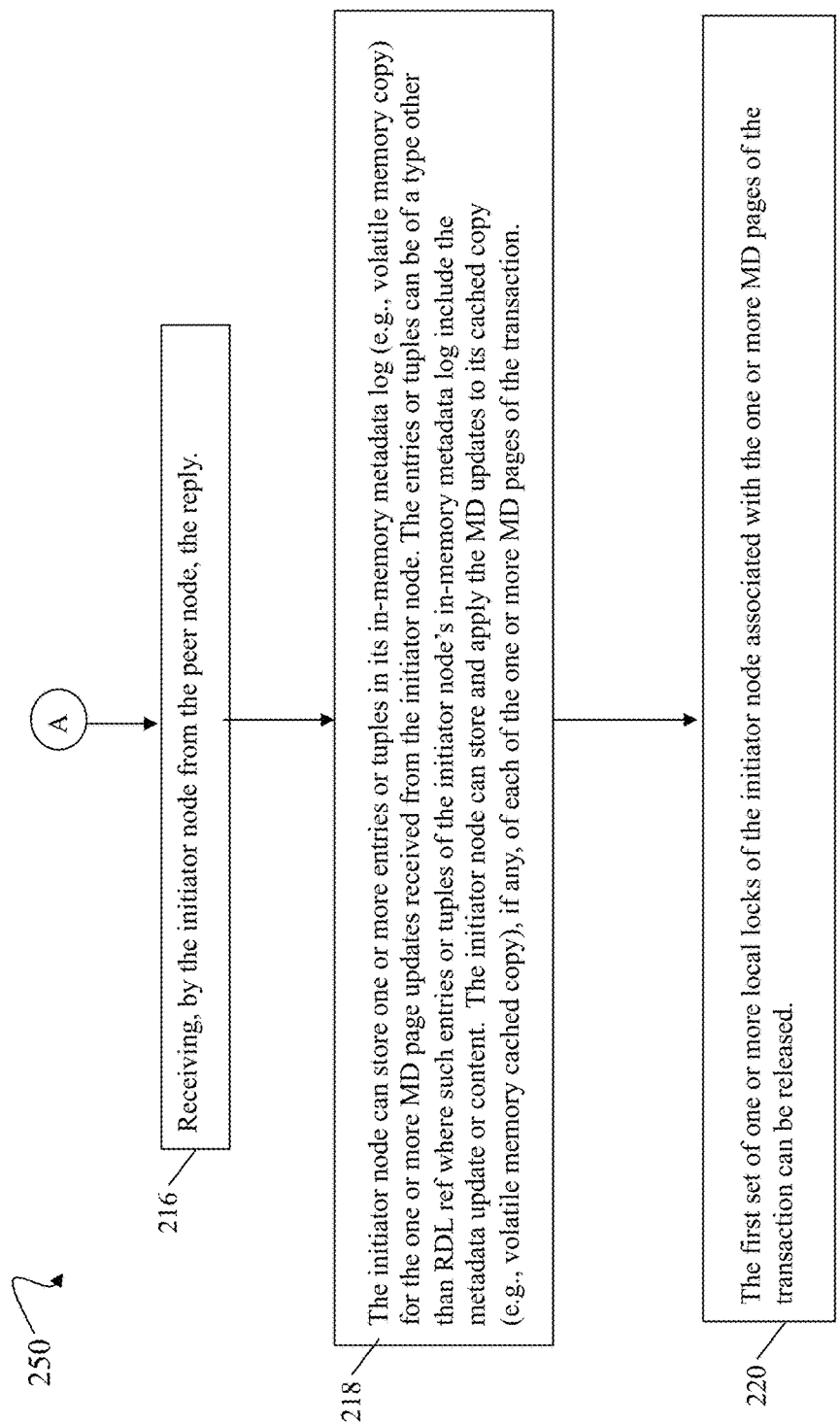

The flowchart of FIGS. 9A and 9B generally describes processing in which an initiator node (sometimes referred to simply as initiator) needs to perform updates on a set of one or more MD pages. Consistent with the '252 application, the flowchart of FIGS. 9A and 9B provides efficient "local" MD page lock semantics and schema. Specifically, the initiator node and its peer node (sometimes referred to simply as a peer) can each have their own local locks for MD pages accessible to both nodes. A request by an initiator node for the local lock for a MD page on the initiator node is a request for exclusive access to the MD page that is node local (e.g., within the scope of the initiator node). A request by an initiator node for the local lock for a MD page on its peer node is a request for exclusive access to the MD page that is node local (e.g., within the scope of the node). Thus local locks of one node can be acquired separately with no dedicated internode lock synchronization between nodes. For each MD page, the initiator node can have a first corresponding local lock and the peer node may have a second corresponding local lock. An initiator node that needs to apply an update to a particular MD page and requires exclusive access to the particular MD page must acquire the first local lock of the initiator node for the particular MD page and also acquire the second local lock of the peer node for the particular MD page prior to applying the update. Once the initiator node has acquired the local lock of the initiator node for the MD page and the local lock of the peer node for the MD page, the initiator node has exclusive access to the MD page and the update can be applied to the MD page. Once the update to the MD page has been applied, the local locks of the initiator node and the peer node previously acquired for the MD page can be released.

The local lock for a MD page can be characterized as local with respect to a single node for the MD page and can be used to provide lock semantics and serialization of access in the scope of only the single node. Thus, in order for a node in a dual node appliance to acquire exclusive access to a MD page, the node needs to acquire a first local lock for the MD page from a first of the two nodes and also acquire a second local lock for the MD page from the remaining node (e.g., a second of the two nodes).

Referring to FIGS. 9A and 9B, shown is a flowchart of processing steps that can be performed in an embodiment in accordance with the techniques herein. Consistent with other discussion herein, the FIGS. 9A and 9B describe processing that can be performed in connection with one particular protocol of the '252 application using a single round of message-reply exchange between an initiator node and its peer node when the initiator node performs processing to service a transaction and apply updates to one or more MD pages of the transaction.

At the step 202, the initiator node needs to update a set of one or more MD pages for a transaction such as, for example, for a write I/O received by the initiator node. The write I/O can write user data or write data to a target logical address expressed as a LUN and LBA. In this case, to service the write I/O operation, the initiator node performs metadata updates to set of one or more MD pages used to map the target logical address to a physical location where the new user data or write data is stored. In at least one embodiment such metadata updates to the MD pages used to access the physical storage location mapped to the target logical address where the new write data is written can be performed when destaging the write data or user data to the BE PDs providing the non-volatile storage for the write data or user data.

The set of one or more MD pages can be included in the MD pages of the MD mapping information or structure (e.g., such as described in connection with FIGS. 3, 4, 5 and 6). In the processing described below in connection with FIGS. 9A-9B in at least one embodiment, the initiator node can be characterized as the preferred node for the LUN of the target logical address; and the remaining peer node can be characterized as the non-preferred node for the LUN of the target logical address. Each of the one or more MD pages can have a first corresponding local lock on the initiator node and a second corresponding local lock on the peer node. In the step 202, the initiator node acquires a first set of the one or more local locks for the set of one or more MD pages of the transaction on the initiator node. From the step 202, control proceeds to the step 204.

At the step 204, the initiator node sends a commit message to its peer node. The commit message is a request from the initiator node to the peer node to acquire a second set of the one or more local locks of the peer node for the set of MD pages of the transaction. The commit message also requests to apply the MD updates to the one or more MD pages. The commit message in this protocol illustrated also includes, as a commit message payload, the MD updates (e.g., updated metadata or content) for the one or more MD pages. From the step 204, control proceeds to the step 206.

At the step 206, the peer node receives the commit message. In response, processing can be performed to acquire, for the initiator node for the transaction, the second set of one or more local locks of the peer node for the set of one or more MD pages of the transaction. From the step 206, control proceeds to the step 208.

At the step 208, the peer node can persistently store, in the persisted metadata log 510, the MD updates to the one or more pages of the transaction. From the step 208, control proceeds to the step 210.

At the step 210, the peer node can store one or more entries or tuples in its in-memory metadata log (e.g., in the peer node's volatile memory) for the one or more MD page updates received from the initiator node. Each such tuple or entry for a MD page update is an RLD ref tuple or entry which references, or points to, a corresponding entry in the persisted metadata log. The corresponding entry of the persisted metadata log includes the actual metadata update or changed content to be applied to the MD page. The peer node can store and apply the MD updates to its node-local cached copy (e.g., node local volatile memory cached copy), if any, of each of the one or more MD pages of the transaction. From the step 210, control proceeds to the step 212.

At the step 212, the second set of one or more local locks of the peer node that are associated with the one or more MD pages of the transaction can be released. From the step 212, control proceeds to the step 214.

At the step 214, a reply message can be sent from the peer node to the initiator node indicating completion of the commit processing by the peer node. From the step 214, control proceeds to the step 216.

At the step 216, the initiator node receives the reply from the peer node. From the step 216, control proceeds to the step 218.

At the step 218, the initiator node can store one or more entries or tuples in its in-memory metadata log (e.g., volatile memory copy) for the one or more MD page updates received from the initiator node. The entries or tuples can be of a type other than RDL ref where such entries or tuples of the initiator node's in-memory metadata log include the metadata update or content. The initiator node can store and apply the MD updates to its cached copy (e.g., volatile memory cached copy), if any, of each of the one or more MD pages of the transaction. From the step 218, control proceeds to the step 220.

At the step 220, the first set of one or more local locks of the initiator node associated with the one or more MD pages of the transaction can be released.

In connection with a local lock requested by an initiator node, such as in connection with the steps 202 and 206, if the requested local lock for a MD page is not available and is currently held by a node in connection with another transaction, processing for the request by the initiator can be blocked and wait in a queue associated with the local lock. In at least one embodiment, if there are multiple requests for multiple transactions blocked and waiting for the local lock, the multiple requests can be placed in the queue in a FIFO (first in first out) order in accordance with the time order in which the multiple requests attempted to acquire the local lock. In response to releasing the local lock of the FIFO queue, a next waiting request, if any, from the queue can proceed to attempt to acquire the local lock of the peer node for the transaction associated with the next waiting request. For example, such a queue as just described can be used in connection each local lock of an initiator node when attempting to acquire its own one or more local locks for one or more MD pages of the transaction in the step 202. Additionally, such a queue as just described can be used in connection each local lock of a peer node when attempting to acquire, on behalf of the commit request from the initiator node for a transaction, one or more local locks of the peer node for the one or more MD pages of the initiator's transaction in the step 206.

In connection with the foregoing description in FIGS. 9A and 9B, the preferred node, which is the initiator node receiving the write I/O operation or more generally initiates the updating the set of MD pages associated with accessing data stored on a particular LUN, records (e.g., in the step 218) all the metadata updates to the set of MD pages in entries of its in-memory metadata log in entries or tuples which are non-RDL type entries. In connection with the foregoing description in FIGS. 9A and 9B, the non-preferred node, which is the peer node that does not receive the write I/O operation or more generally does not initiate the updating of the set of MD pages associated with accessing data stored on a particular LUN, records (e.g., in the step 210) all the metadata updates to the set of MD pages in entries of its in-memory metadata log in entries or tuples which are RDL type entries with pointers or references to copies of the actual metadata updates persistently stored in the persisted metadata log.

As a variation from that described in FIGS. 9A and 9B, consider an embodiment using the MD structure or mapping information as described, for example, in connection with FIGS. 3, 4, 5, and 6. In such an embodiment, the nodes can distinguish between different types or categories of MD pages such as, for example, top MD pages, mid MD pages and leaf MD pages. Generally, it can be that the mid and leaf MD pages used in mapping a logical address of a particular LUN to a physical location storing user data for the logical address are owned by the particular LUN (e.g., such mid and leaf MD pages are used exclusively in connection with accessing user data stored on the particular LUN and not otherwise used when accessing user data stored on any other LUN). Also generally, it can be that the top MD pages used in mapping a logical address of a particular LUN to a physical location storing user data for the logical address are shared by multiple LUNs in that the same top MD page can be used in connection with accessing data stored on the multiple LUNs. In such an embodiment as a variation to that described above in connection with FIGS. 9A and 9B, for any shared MD pages, both nodes can record any MD changes to a shared MD page using entries or tuples which are not RDL ref type entries and which store the MD page changes or deltas in the entries of the in-memory metadata logs (e.g., volatile memory) of the nodes. Based on this variation, the peer node or non-preferred node for the LUN in the step 210 can record MD changes for the mid and leaf MD pages owned by the LUN in its in-memory metadata log using RDL entries since such mid and leaf MD pages can be characterized as affined by the single LUN and also affined to the initiator or preferred node expected to service most or all I/Os directed to the LUN. Additionally in this variation, the peer node in the step 210 can record any MD changes to a top MD page (e.g., which is a shared MD page) using entries or tuples in its in-memory meta log using non-RDL ref type entries that store the metadata changes or deltas in the entries of the in-memory metadata log (e.g., volatile memory) of the peer node.

In connection with the processing of FIGS. 9A and 9B, the designation of a node as preferred with respect to a particular LUN can be made on a per I/O basis where the particular node that receives the I/O (e.g., the initiator node) directed to the LUN is deemed to be the current preferred node for the particular LUN, and where the remaining peer node is deemed to be the current non-preferred node for the particular LUN.

More generally and consistent with other discussion herein, the designation of a node as preferred or non-preferred with respect to a particular LUN can be made using one or more criteria. In at least one embodiment, the preferred node with respect to a LUN can be assumed to be the node that will handle subsequent I/Os directed to the LUN. As such, the preferred node for the LUN can therefore be an affined node in connection with MD pages used to map logical addresses of the particular LUN to corresponding physical storage locations containing user data stored as such logical addresses of the particular LUN. As such, the preferred node for the LUN can therefore use suitable non-RDL type entries its in-memory metadata log to record metadata changes to MD pages which are used to access user data stored on the LUN. Such non-RDL type entries store the actual metadata changes in entries of the in-memory metadata log of the preferred node. In a similar manner, a non-preferred node with respect to a LUN can be assumed to be the node that will typically not handle subsequent I/Os directed to the LUN. As such, the non-preferred node for the LUN can therefore use RDL type entries in its in-memory metadata log to record metadata changes to at least the set of one or more MD pages which are owned by the LUN (e.g., used exclusively in connection with mapping logical addresses of the LUN to corresponding physical storage locations and not used in connection with mapping logical addresses for any other LUN; and used exclusively in connection with access user data stored on the LUN and not used in connection with accessing user data stored on any other LUN). In some embodiments it may not be possible or easy to determine which MD pages are owned or used exclusively with a particular LUN. In this case as well as for possibly other reasons, the non-preferred node for the LUN can therefore use RDL type entries in its in-memory metadata log to record metadata changes to any MD page used in connection with accessing user data stored on the LUN (e.g., such as described above in connection with the step 210 of FIG. 9A).

In at least one embodiment, a designation of primary or non-primary for a node with respect to a LUN can be determined using one or more criteria. The one or more criteria can include, for example, one or more of: host configuration information regarding preferred node or path designations for the LUN; data storage system configuration information regarding preferred node or path designations for the LUN; preferred/non-preferred node designation on a per I/O basis for I/Os directed to the LUN (e.g., where the node receiving the I/O for the LUN is deemed the current preferred node for the LUN and the peer node is deemed the current non-preferred node for the LUN; and/or statistical tracking at runtime regarding I/O workload of the LUN sent to each node or path over which the LUN is exposed. In an ALUA-based configuration, the host can be allowed to specify preferred (e.g., optimized) or non-preferred (e.g., non-optimized) paths for the LUN. In this case, the host-based ALUA path states can be used as the host configuration information providing preferred node or path designations for the LUN. In an ALUA-based configuration, the data storage system can be allowed to specify preferred (e.g., optimized) or non-preferred (e.g., non-optimized) paths for the LUN. In this case, the data storage system-based ALUA path states can be used as the data storage system configuration information providing preferred node or path designations for the LUN.

In at least one embodiment, the host and/or data storage system can perform processing to monitor the I/O workload sent to the LUN over each of the different paths over which the LUN is exposed. Based on the monitoring, one or more I/O workload metrics can be used to obtain a measurement of the particular LUN's I/O workload going to each node. If the observed I/O workload of the LUN directed to a node is above a specified threshold, the node can be designated as a preferred node with respect to the LUN; and otherwise, the node can be designated as a non-preferred node for the LUN. Such monitoring an I/O workload metrics can be used, for example, in non-ALUA based configurations which may otherwise not provide preferred path or preferred node hints regarding a particular LUN.

Figure 10:
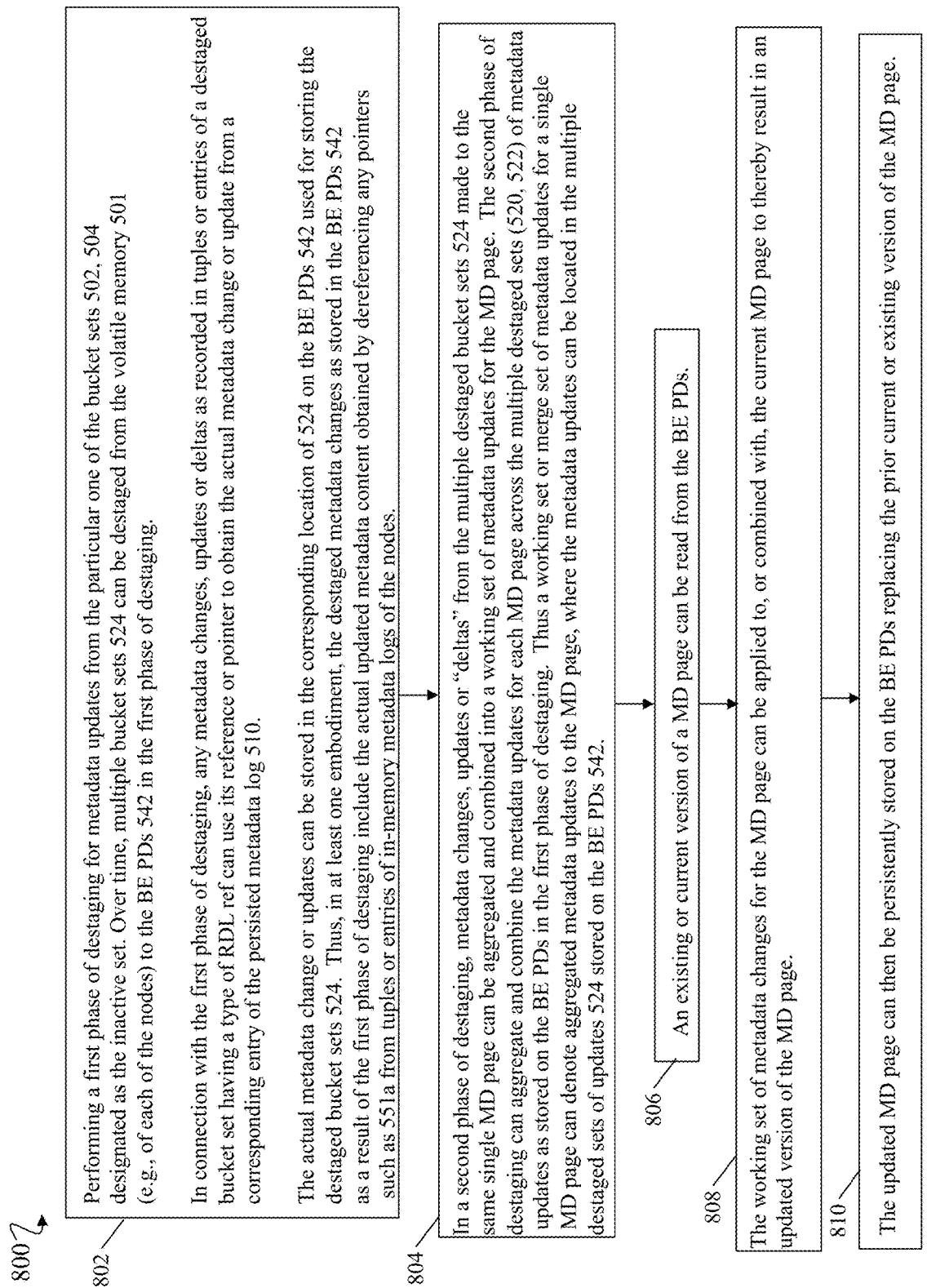

Referring to FIG. 10, shown is a flowchart 800 of processing steps that can be performed in at least one embodiment in connection with destaging metadata changes in accordance with the techniques of the present disclosure. The flowchart 800 generally summarized processing described above, for example, in connection with FIG. 7B. The description below regarding the flowchart 800 is made with reference to elements of FIG. 7B.

At the step 802, a first phase of destaging can be performed by a node for metadata updates from the particular one of the bucket sets 502, 504 (e.g. the in-memory metadata log of the node) designated as the inactive set. Over time, multiple bucket sets 524 can be destaged from the volatile memory 501 (e.g., of each of the nodes) to the BE PDs 542 in the first phase of destaging. In connection with the first phase of destaging, any metadata changes, updates or deltas as recorded in tuples or entries of a destaged bucket set having a type of RDL ref can use its reference or pointer to obtain the actual metadata change or update from a corresponding entry of the persisted metadata log 510. The actual metadata changes or updates retrieved from corresponding entries of the persisted metadata log 510 can be stored in the corresponding location of 524 on the BE PDs 542 used for storing the destaged bucket sets 524. Thus, in at least one embodiment, the destaged metadata changes as stored in the BE PDs 542 as a result of the first phase of destaging include the actual updated metadata content obtained by dereferencing any pointers such as 551a from RDL ref type tuples or entries of in-memory metadata logs of the nodes. From the step 802, control proceeds to the step 804.

At the step 804, in a second phase of destaging as can be performed by a node, metadata changes, updates or "deltas" from the multiple destaged bucket sets 524 made to the same single MD page can be aggregated and combined into a working set of metadata updates for the MD page. The second phase of destaging can include aggregating and combining the metadata updates for each MD page across the multiple destaged sets (520, 522) of metadata updates as stored in the destaged bucket sets 524 on the BE PDs 542 in the first phase of destaging. Thus a working set or merge set of metadata updates for a single MD page can denote aggregated metadata updates to the MD page, where the metadata updates can be located in the multiple destaged sets of updates 524 stored on the BE PDs 542. From the step 804, control proceeds to the step 806.

The steps 806, 808 and 810 are described in connection with a single MD page. More generally these same steps can be repeated for other MD pages. In at least one embodiment, the steps 806, 808 and 810 can also be processing steps included in the second phase of destaging.

At the step 806, a node reads an existing or current version of a MD page from the BE PDs such as from the persisted MD page store 540. In at least one embodiment, the existing or current version of the MD page can be read from the MD page store 540 and then stored in a volatile memory location in the cache of the node. From the step 806, control proceeds to the step 808.

At the step 808, the node can perform processing to combine or apply the working set of metadata changes for the MD page to the current MD page as stored in the node's cache to thereby result in an updated version of the MD page being stored in the node's cache. From the step 808, control proceeds to the step 810.

At the step 810, the node can store the updated MD page persistently in the MD page store 540 on the BE PDs thereby replacing the prior current or existing version of the MD page.

An embodiment in accordance with the techniques of the present disclosure can also perform further optimizations regarding the RDL ref type tuples or entries of the in-memory metadata logs of the nodes. In at least one embodiment, an RDL ref type tuple or entry stored in a node's in-memory metadata log can be processed by the node at various points in time in connection with processing described herein. As described herein (e.g., such as in connection with FIG. 7B) the RDL ref type entry includes a pointer or reference to a corresponding entry in the persisted metadata log where the corresponding entry includes the actual metadata change or content to be applied to an existing MD page. When the foregoing pointer or reference of the RDL ref type entry is used by a node to obtain the actual metadata change or content from the persisted metadata log, the node can then store the actual metadata change or content in its volatile memory. The metadata change associated with an RDL ref type entry can be stored, for example, in the volatile memory cache of the node, or in the node's in-memory metadata log. In this manner, the node can potentially reuse the cached metadata changes such as when processing subsequent RDL ref type entries which reference or point to the same corresponding entries in the persisted metadata log. For example, a first RDL ref type entry can include a first pointer or address of a first entry in the persisted metadata log where the first entry includes a first metadata change for a first MD page. The node can store the first metadata change in its node-local volatile memory cache. At a later point in time, the node can process a second RDL ref type entry which includes a second pointer or address to an entry in the persisted metadata log. Before fetching the metadata change using the second pointer or address, the node can determine whether the second pointer or address (e.g., pointer to or address in the persisted metadata log) of the second RDL ref type entry matches a previously processed pointer or address of an entry in the persisted metadata log. If the second pointer matches, for example, the first pointer, then the second pointer maps to the same location, entry or address in the persisted metadata log as the first pointer. In this case, the node can determine that the second pointer also references the same first metadata change as the first pointer whereby the node can use the node's cached version of the first metadata change. Otherwise, if the second pointer does not match a previously processed pointer for which a metadata change is cached in the node's volatile memory, then the node can proceed with obtaining the new metadata change from the persisted metadata log using the second pointer and then caching the new metadata change in the node's volatile memory.

As another optimization, a node can parallelize reading metadata changes or content read from the persisted metadata log when processing multiple RDF ref type entries stored in the node's in-memory metadata log. As yet another optimization, once the node obtains multiple metadata changes from the persisted log for the multiple RDF ref type entries, the multiple metadata changes can also be applied, for example, in parallel or out of time-order such as, for example, when the metadata changes are independent of one another.

In at least one embodiment of a data storage system or appliance including the two nodes such as described above, the system or appliance can be configured to provide high availability. In particular, one of the nodes can fail or otherwise be unavailable to service I/Os. In this case, the remaining healthy peer node can take over and service all I/Os and other processing which would normally otherwise be performed by both nodes. In at least one embodiment configured using ALUA path states such as described, for example, in connection with FIG. 7A, a host or other client can no longer send I/Os to LUNs over any optimized or preferred paths to the failed or unavailable node. As a result, the host or other client can alternatively send the I/Os to the LUNs over non-optimized or non-preferred paths to the remaining healthy peer node. The peer node can be non-preferred for one or more of the LUNs. Thus the peer node's in-memory metadata log can include RDL ref type entries for recorded metadata changes to MD pages used in connection with servicing I/Os for such non-preferred LUNs. The peer node can perform processing using the techniques of the present disclosure, for example, to apply the metadata changes to such MD pages using the pointers or references to the metadata changes as stored in the persisted metadata log, where the pointers or references are included in the associated RDL ref type entries of the peer node's in-memory metadata log.

Continuing with the above example where one of the nodes fails over to the remaining single healthy peer node, in at least one embodiment, the non-preferred peer node for a first LUN can transition to a preferred peer node for the first LUN. The transition can occur, for example, after one or more I/Os directed to the first LUN are received at the non-preferred peer node. In at least one embodiment, the peer node can become a designated peer node for the first LUN responsive to the peer node receiving a first or initial I/O subsequent to the failure of the first node. As a variation in at least one embodiment, the peer node can become a designated peer node for the first LUN responsive to the peer node receiving at least a specified number of I/Os or at least a minimum amount of I/O workload of the first LUN subsequent to the failure of the first node. More generally, an embodiment can specify one or more criteria, examples of which are provided herein, which must be met for a node to be designated as a preferred node for a LUN such as the first LUN.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   receiving, at a first node, a metadata update request to apply a first metadata change to a first metadata page;
   acquiring, by the first node, a first lock on the first node for the first metadata page;
   sending a commit message from the first node to a second node, wherein the commit message is a request by the first node to acquire a second lock for the first metadata page on the second node and apply the first metadata change to the first metadata page, and wherein the commit message includes the first metadata change for the first metadata page;
   acquiring, by the first node, the second lock for the first metadata page;
   persistently storing, by the second node, the first metadata change to the first metadata page in a first persisted entry of a persisted metadata log;
   recording, in an in-memory metadata log of the second node, a first entry for the first metadata change to the first metadata page, wherein the first entry includes a reference or pointer to the first persisted entry of the persisted metadata log;
   releasing the second lock for the first metadata page;
   sending, from the second node to the first node, a reply to the commit message; and
   responsive to receiving the reply, performing first processing by the first node including:
      recording, in an in-memory metadata log of the first node, a second entry for the first metadata change to the first metadata page, wherein the second entry includes the first metadata change to the first metadata page; and
      releasing the first lock for the first metadata page, wherein the first node and the second node are included in a same data storage system, wherein a first set of one or more paths are between one or more initiator ports of a host and a first set of one or more target ports of the first node, wherein a second set of one or more paths are between one or more initiator ports of the host and a second set of one or more target ports of the second node, wherein the first node is a preferred node for servicing I/O operations for a first logical device exposed to the host over the first set of one or more paths between the host and the first node, and wherein the second node is a non-preferred node for servicing I/O operations for the first logical device exposed to the host over the second set of one or more paths between the host and the second node.

2. The computer-implemented method of claim 1, wherein each path of the first set of one or more paths is configured as an optimized or preferred path for the first logical device, wherein each path of the second set of one or more paths is configured as a non-optimized or non-preferred path for the first logical device, and wherein the method further includes:
   issuing, by the host, I/Os to the first logical device over one or more of the optimized paths of the first set of one or more paths between the host and the first node, wherein the host only issues I/Os to the first logical device over a non-optimized or non-preferred path of the second set of one or more paths when there is no available optimized or preferred path of the first set of one or more paths between the host and the first node.

3. The computer-implemented method of claim 2, further comprising:
   determining, by the host, that there is no available optimized or preferred path of the first set of one or more paths between the host and the first node; and
   responsive to said determining, sending, by the host, a first I/O operation to the first logical device over a first of the non-optimized or non-preferred paths of the second set of one or more paths between the host and the second node.

4. The computer-implemented method of claim 3, wherein the first non-optimized or non-preferred path is between a first initiator of the host and a first target port of the second node, wherein the first I/O operation is a write I/O operation that writes first data to a target logical address on the first logical device, and wherein the method further comprises:
   receiving, by the second node, the write I/O operation at the first target port;
   determining, in accordance with one or more criteria, that the second node is a preferred node for the first logical device;
   performing second processing to service the write I/O operation, said second processing including:
      determining a second metadata change to a second metadata page, wherein the second metadata page is used in connection with accessing the target logical address of the first logical device;
      persistently storing, by the second node, the second metadata change to the second metadata page in a second persisted entry of the persisted metadata log; and
      recording, in the in-memory metadata log of the second node, a third entry for the second metadata change to the second metadata page, wherein the third entry includes the second metadata change to the second metadata page.

5. The computer-implemented method of claim 4, wherein the one or more criteria specify that the second node is designated as a preferred node for the first logical device responsive to the second node receiving at least a specified amount of I/O workload for the first logical device.

6. The computer-implemented method of claim 4, wherein the one or more criteria specify that the second node is designated as a preferred node for the first logical device responsive to configuration information of the host or the same data storage system indicating that the second node is designated as a preferred node for the first logical device.

7. The computer-implemented method of claim 1, further comprising:
   receiving, at the first node, a read I/O operation to read first data from a target logical address on the first logical device;
   determining, by the first node, that the first metadata page is needed to access the first data stored at the target logical address on the first logical device;

determining, by the first node, that the first metadata page is not included in a volatile memory cache of the first node; and responsive to determining by the first node that the first metadata page is not included in the volatile memory cache of the first node, constructing, by the first node, a latest version of the first metadata page.

8. The computer-implemented method of claim 7, wherein said constructing the latest version of the first metadata page further comprises:

retrieving, by the first node, a stored version of the first metadata page from non-volatile backend storage; and applying, by the first node, a set of one or more metadata changes to the stored version of the first metadata page to generate the latest version of the first metadata page wherein the set of one or more metadata changes includes the first metadata change as recorded in the second entry of the in-memory metadata log of the first node.

9. The computer-implemented method of claim 8, wherein responsive to constructing, by the first node, the latest version of the first metadata page, performing processing comprising:

storing, by the first node, the latest version of the first metadata page in the volatile memory cache of the first node.

10. The computer-implemented method of claim 1, further comprising:

receiving, at the second node, a read I/O operation to read first data from a target logical address on the first logical device;

determining, by the second node, that the first metadata page is needed to access the first data stored at the target logical address on the first logical device;

determining, by the second node, that the first metadata page is not included in a volatile memory cache of the second node; and responsive to determining, by the second node, that the first metadata page is not included in the volatile memory cache of the second node, constructing, by the second node, a latest version of the first metadata page.

11. computer-implemented method of claim 10, wherein said constructing the latest version of the first metadata page by the second node further comprises:

retrieving, by the second node, a stored version of the first metadata page from non-volatile backend storage; and applying, by the second node, a set of one or more metadata changes to the stored version of the first metadata page to generate the latest version of the first metadata page, wherein the set of one or more metadata changes includes the first metadata change recorded by the first entry of the in-memory metadata log of the second node.

12. The computer-implemented method of claim 11, wherein said applying the set of one or more metadata changes by the second node further includes:

using the reference or pointer of the first entry of the in-memory metadata log of the second node to access the first persisted entry of the persisted metadata log; and obtaining, by the second node, the first metadata change from the first persisted entry of the persisted metadata log.

13. The computer-implemented method of claim 1, destaging metadata updates from the in-memory metadata log of the second node, wherein said destaging includes:

using the reference or pointer of the first entry of the in-memory metadata log of the second node to access the first persisted entry of the persisted metadata log;

obtaining, by the second node, the first metadata change from the first persisted entry of the persisted metadata log; and storing, on non-volatile storage, a corresponding entry for the first entry of the in-memory metadata log, wherein the corresponding entry includes the first metadata change rather than the reference or pointer to the first persisted entry of the persisted metadata log.

14. A system comprising:

one or more processors; and one or more memories comprising code stored thereon that, when executed, performs a method of comprising:

receiving, at a first node, a metadata update request to apply a first metadata change to a first metadata page;

acquiring, by the first node, a first lock on the first node for the first metadata page;

sending a commit message from the first node to a second node, wherein the commit message is a request by the first node to acquire a second lock for the first metadata page on the second node and apply the first metadata change to the first metadata page, and wherein the commit message includes the first metadata change for the first metadata page;

acquiring, by the first node, the second lock for the first metadata page;

persistently storing, by the second node, the first metadata change to the first metadata page in a first persisted entry of a persisted metadata log;

recording, in an in-memory metadata log of the second node, a first entry for the first metadata change to the first metadata page, wherein the first entry includes a reference or pointer to the first persisted entry of the persisted metadata log;

releasing the second lock for the first metadata page;

sending, from the second node to the first node, a reply to the commit message; and responsive to receiving the reply, performing first processing by the first node including:

recording, in an in-memory metadata log of the first node, a second entry for the first metadata change to the first metadata page, wherein the second entry includes the first metadata change to the first metadata page; and releasing the first lock for the first metadata page, wherein the first node and the second node are included in a same data storage system, wherein a first set of one or more paths are between one or more initiator ports of a host and a first set of one or more target ports of the first node, wherein a second set of one or more paths are between one or more initiator ports of the host and a second set of one or more target ports of the second node, wherein the first node is a preferred node for servicing I/O operations for a first logical device exposed to the host over the first set of one or more paths between the host and the first node, and wherein the second node is a non-preferred node for servicing I/O operations for the first logical device exposed to the host over the second set of one or more paths between the host and the second node.

15. The system of claim 5, wherein each path of the first set of one or more paths is configured as an optimized or preferred path for the first logical device, wherein each path of the second set of one or more paths is configured as a non-optimized or non-preferred path for the first logical device, and wherein the method further includes:

issuing, by the host, I/Os to the first logical device over one or more of the optimized paths of the first set of one or more paths between the host and the first node, wherein the host only issues I/Os to the first logical device over a non-optimized or non-preferred path of the second set of one or more paths when there is no available optimized or preferred path of the first set of one or more paths between the host and the first node.

16. A non-transitory computer readable medium comprising code stored thereon that, when executed, performs a method comprising:

receiving, at a first node, a metadata update request to apply a first metadata change to a first metadata page;

acquiring, by the first node, a first lock on the first node for the first metadata page;

sending a commit message from the first node to a second node, wherein the commit message is a request by the first node to acquire a second lock for the first metadata page on the second node and apply the first metadata change to the first metadata page, and wherein the commit message includes the first metadata change for the first metadata page;

acquiring, by the first node, the second lock for the first metadata page;

persistently storing, by the second node, the first metadata change to the first metadata page in a first persisted entry of a persisted metadata log;

recording, in an in-memory metadata log of the second node, a first entry for the first metadata change to the first metadata page, wherein the first entry includes a reference or pointer to the first persisted entry of the persisted metadata log;

releasing the second lock for the first metadata page;

sending, from the second node to the first node, a reply to the commit message; and responsive to receiving the reply, performing first processing by the first node including:

recording, in an in-memory metadata log of the first node, a second entry for the first metadata change to the first metadata page, wherein the second entry includes the first metadata change to the first metadata page; and releasing the first lock for the first metadata page, wherein the first node and the second node are included in a same data storage system, wherein a first set of one or more paths are between one or more initiator ports of a host and a first set of one or more target ports of the first node, wherein a second set of one or more paths are between one or more initiator ports of the host and a second set of one or more target ports of the second node, wherein the first node is a preferred node for servicing I/O operations for a first logical device exposed to the host over the first set of one or more paths between the host and the first node, and wherein the second node is a non-preferred node for servicing I/O operations for the first logical device exposed to the host over the second set of one or more paths between the host and the second node.

17. The non-transitory computer readable medium of claim 16, wherein each path of the first set of one or more paths is configured as an optimized or preferred path for the first logical device, wherein each path of the second set of one or more paths is configured as a non-optimized or non-preferred path for the first logical device, and wherein the method further includes:

issuing, by the host, I/Os to the first logical device over one or more of the optimized paths of the first set of one or more paths between the host and the first node, wherein the host only issues I/Os to the first logical device over a non-optimized or non-preferred path of the second set of one or more paths when there is no available optimized or preferred path of the first set of one or more paths between the host and the first node.

\* \* \* \* \*